United States Patent
Somerville et al.

(10) Patent No.: US 10,049,398 B2
(45) Date of Patent: Aug. 14, 2018

(54) SYSTEMS AND METHODS FOR A COLOR MANAGEMENT SYSTEM

(71) Applicants: Dennis A. Somerville, Cleveland, OH (US); John S. Ceglarek, Cleveland, OH (US)

(72) Inventors: Dennis A. Somerville, Cleveland, OH (US); John S. Ceglarek, Cleveland, OH (US)

(73) Assignee: THE SHERWIN-WILLIAMS COMPANY, Cleveland, OH (US)

( * ) Notice: Subject to any disclaimer, the term of this patent is extended or adjusted under 35 U.S.C. 154(b) by 726 days.

(21) Appl. No.: 14/521,898

(22) Filed: Oct. 23, 2014

(65) Prior Publication Data
US 2015/0120492 A1    Apr. 30, 2015

Related U.S. Application Data

(60) Provisional application No. 61/895,578, filed on Oct. 25, 2013, provisional application No. 61/904,729, filed on Nov. 15, 2013.

(51) Int. Cl.
*G06Q 30/06* (2012.01)
*G06F 3/0484* (2013.01)

(52) U.S. Cl.
CPC ..... *G06Q 30/0631* (2013.01); *G06Q 30/0621* (2013.01); *G06F 3/0484* (2013.01)

(58) Field of Classification Search
None
See application file for complete search history.

(56) References Cited

U.S. PATENT DOCUMENTS

| | | | | |
|---|---|---|---|---|
| 5,615,320 A * | 3/1997 | Lavendel | ............. | G06T 11/001 345/593 |
| 5,855,626 A * | 1/1999 | Wiegner | ............. | B01F 13/1055 222/1 |
| 5,907,495 A * | 5/1999 | Snyder | ...................... | G01J 3/46 356/405 |
| 6,421,651 B1 * | 7/2002 | Tedesco | ................. | G06Q 10/02 705/5 |
| 2004/0133306 A1 * | 7/2004 | Garabedian | ............. | A47L 13/12 134/26 |
| 2007/0035554 A1 * | 2/2007 | McClanahan | ............. | G01J 3/46 345/589 |
| 2008/0147348 A1 * | 6/2008 | Lewis | ...................... | G01J 3/02 702/127 |
| 2009/0248199 A1 * | 10/2009 | Milhorn | ............. | B01F 13/1055 700/239 |

* cited by examiner

*Primary Examiner* — Kathleen Palavecino
*Assistant Examiner* — Abby J Flynn
(74) *Attorney, Agent, or Firm* — Jones Day

(57) ABSTRACT

Computer-implemented systems and methods are provided for determining an amount of color additive to add to paint. Color measurement data is transmitted via a network is received at a server. A color formulation is identified based on the color measurement data. Historical color recommendation data is accessed from a data repository, where the data repository contains color data that is based on previous color recommendations. The color formulation is adjusted based on the historical color recommendation data, and the adjusted color formulation is transmitted from the server via the network.

18 Claims, 24 Drawing Sheets

AVAILABLE FORMULAS FOR USAGE

◇ AVAILABLE COLOR CHIPS

| | FORMULA NAME | COLOR NAME | FORMULA NUMBER | PRODUCT | DATE | CHIP(S) |
|---|---|---|---|---|---|---|
| COMPARE | 3953160 | GRAY MET | 3953169 v1 | B7 | 27-APR 2006 | ✓ |
| COMPARE | 4111977 | GRAY MET | 4111977 v1 | D5 | 26-SEP 2006 | |
| COMPARE | 5416865 | GRAY MET | 5416865 v1 | AWP | 28-APR 2012 | ✓ |
| COMPARE | 4042691 | GRAY MET | 4042691 v1 | 5A | 18-JUL 2006 | |
| COMPARE | 1766589 | GRAY MET | 1766589 v1 | 5B | 21-JAN 2000 | |
| COMPARE | 4981283 | GRAY MET | 4981283 v1 | 6B | 15-NOV 2010 | |
| COMPARE | 5526315 | | 5526315 v1 | AWP | 19-JUL 2013 | ✓ |
| COMPARE | 4575393 | GRAY MET | 4575393 v1 | B7 | 02-JUL 2008 | ✓ |
| COMPARE | 2543152 | GRAY MET | 2543152 v1 | 3U | 18-MAR 2002 | |
| COMPARE | 4524358 | GRAY MET | 4524358 v1 | D2 | 06-MAY 2008 | |
| COMPARE | 4069062 | GRAY MET | 4069062 v1 | D6 | 31-AUG 2006 | |
| COMPARE | 5373761 | ISUZU-90L-STANDARD | 5373761 v1 | 141 | 28-JUN 2013 | ✓ |
| COMPARE | 2162005 | GRAY MET | 2162005 v1 | 5U | 04-FEB 2001 | |
| COMPARE | 2783281 | GRAY MET | 2783281 v1 | U7 | 26-JAN 2008 | |
| COMPARE | 4504055 | GRAY MET | 4504055 v1 | 3B | 03-APR 2008 | |
| COMPARE | 5295096 | ISUZU-90L-STANDARD | 5295096 v1 | 835 | 30-JAN 2014 | ✓ |
| COMPARE | 5507564 | | 5507564 v1 | 141 | 30-MAY 2013 | ✓ |
| | | | 5000744 v1 | 3BC | 30-NOV 2010 | |

Search?UsaneId=417222&FormulaStatus=Active&ColorChipID=0#

*Fig. 13*

| Color Comparison | | | |
|---|---|---|---|
| Formula Name:<br>4111977 | Color Name:<br>Gray Met | Formula Number: 4111977<br>Formula Version: 1<br>Formula Date: 26-Sep 2006 | Made By: Automotive Admin<br>Quality: Dimension Pro<br>Cost: N/A |
| Flop | [DARKER] [LIGHTER] | [GREENER] [REDDER] | [LESS SAT] [MORE SAT] |

| Formula Name | Color Name |
|---|---|
| 3953160 | ISUZU-90L |
| 5416865 | ISUZU-90L |
| 4042691 | ISUZU-90L |
| 1766589 | Gray Met |
| 4981283 | Gray Met |
| 5526315 | |
| 4575393 | Gray Met |
| 2543152 | Gray Met |
| 4524358 | Gray Met |
| 4069062 | Gray Met |
| 5373761 | ISUZU-90L |
| 2162005 | Gray Met |
| 2703201 | Gray Met |
| 4504055 | Gray Met |
| 5295096 | ISUZU-90L |

Fig. 18

Color Comparison

| Formula Name: | Color Name: | Formula Number: 4111977 | Made By: Automotive Admin |
|---|---|---|---|
| 4111977 | Gray Met | Formula Version: 1 | Quality: Dimension Pro |
|  |  | Formula Date: 26-Sep 2006 | Cost: N/A |

Flop: [DARKER] [LIGHTER]   [GREENER] [REDDER]   [LESS SAT] [MORE SAT]

| Formula Name | Color Name | ΔL | Lightness ⇔ | Δh | Hue ⇔ | Δc | Saturation ⇔ |
|---|---|---|---|---|---|---|---|
| 3953160 | ISUZU-90L | 0.9 | □ | 1.1 | □ | -0.3 | □ |
| 5526315 |  | 1.4 | □ | 0.0 |  | 0.0 |  |

*Fig. 21*

SYSTEMS AND METHODS FOR A COLOR MANAGEMENT SYSTEM

CROSS-REFERENCE TO RELATED APPLICATIONS

This application claims priority to U.S. Provisional Patent Application No. 61/895,578, entitled "Systems and Methods for a Color Management System," filed Oct. 25, 2013, and U.S. Provisional Patent Application No. 61/904,729, entitled "Systems and Methods for a Color Management System," filed Nov. 15, 2013, the entirety of both of which is herein incorporated by reference.

FIELD

This invention relates generally to paint color matching and more particularly to personalized paint color matching over a network.

BACKGROUND

Providing high quality color recommendations for clients is often a high stakes endeavor that relies heavily on expert personnel who have experience and abilities well suited for meeting customer expectations. Such persons have an ability to anticipate colors that will look good for the type of project at hand that will meet client desires. Because colors have several different parameters that can be adjusted (e.g., hue, saturation, lightness), it can be time consuming to manually adjust parameters to identify a desirable color. Systems and methods as described herein provide mechanisms for automating color identification based on stored user preferences and other mechanisms for streamlining desired color location.

SUMMARY

Systems and methods as described herein relate generally to a system and method of paint color matching for a variety of substrates that can be conducted at remote locations worldwide, and be readily available to a user over the internet or cloud-based computing, through multiple devices such as PCs, tablets, and mobile devices. The system utilizes a suite of modules that can be accessed by up to thousands of users globally in real time and on-demand. The system modules can integrate user specifications and requirements relating not only to spectral color data for varying substrates, but also environmental, regulatory, and inventory data, to name a few. Such modules can be integrated with formulations processes and devices such as spectrophotometers, scales, dispensers, printers and the like. Information is saved from these devices and processed to a central repository. The system can also be integrated with external third-party systems wherein, for example, such third party user can access such system to review custom orders or other customer-specific information as stored on the system.

Systems and methods described herein include an internet-networked centralized system that efficiently provides color technology (including color matching and color formulations) for any coating technology. For example, a system can provide a color formulation for a target color match for various technologies and substrates, such as color formulations for architectural paint, automotive paint, and/or OEM finishes, and the system can account for factors that affect the actual color in accordance with a user's input of the application requirements and/or specifications. In one embodiment, color formulations are derived from historical data formulations stored in a color matching engine data repository module. In another embodiment, color formulations can be derived from a color matching engine comprising a software program for determining a color match that can be based on historical color data and adjusted therefrom, or through an algorithm to predict by an iterative process the color formulation to theoretically match the target color. The final color formulation is saved to the color engine data repository and then transmitted from the server via the network.

In another embodiment, the color matching system is an internet-based system that commands one or more data modules to perform operations based on a request by an end-user. In this aspect, a target color request is transmitted via a network and received at a server comprising modules of a color measurement devices such as a spectrophotometer (available from X-Rite, Inc., Grand Rapids, Mich.), coupled to a color matching engine comprising a color data repository, wherein the repository contains color data that is based on previous color recommendations. The color formulation is adjusted based on the historical color data, then saved to the color engine data repository, and then transmitted from the server via the network.

BRIEF DESCRIPTION OF THE DRAWINGS

FIG. 13 is a display depicting a pool of candidate colors, such as after an initial pool filtering.

FIG. 18 is a diagram depicting an example color filtering display having an alternate filter control format.

FIG. 21 depicts the display of FIG. 20 following selection of filter control buttons to command display of colors that are lighter, redder, and less saturated than the reference color.

DETAILED DESCRIPTION OF THE DRAWINGS

Figure 1:
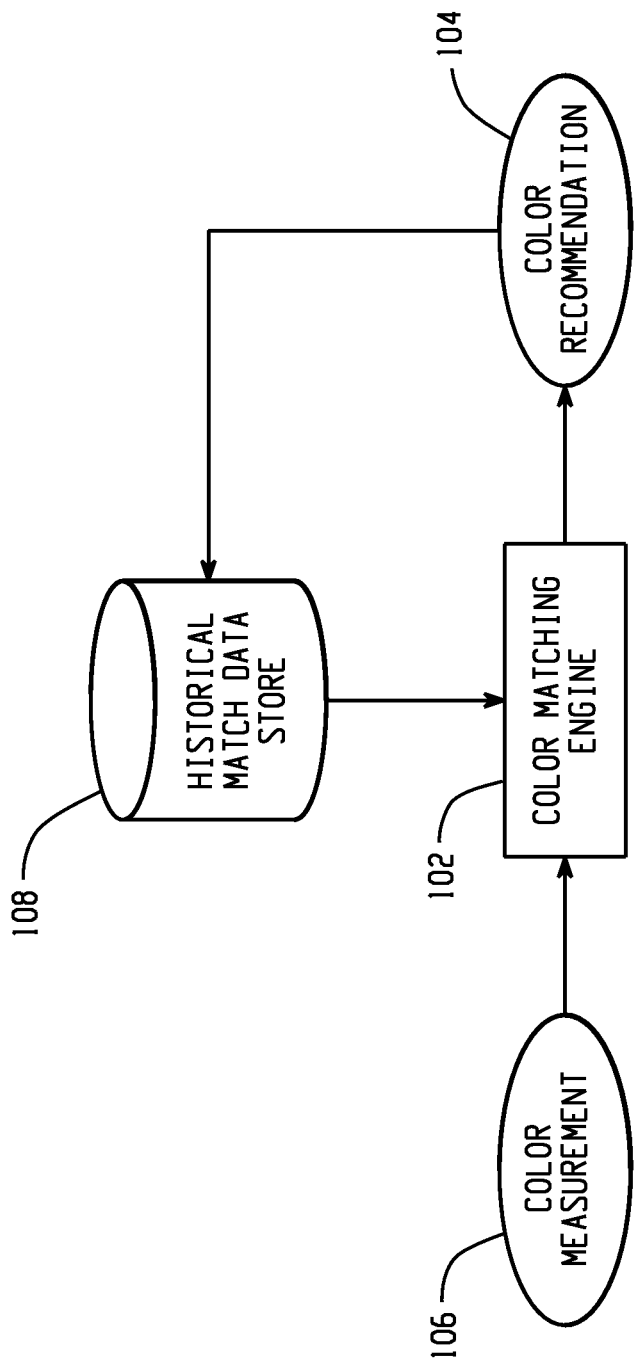
FIG. 1 is a block diagram depicting a system for generating a color recommendation based on a color measurement and data from a historical match data store.

FIG. 1 is a block diagram depicting a system for generating a color recommendation based on a color measurement and data from a historical match data store. For example, the color matching engine 102 may implement a method of determining an amount of color additive to add to paint as a color recommendation 104. The color matching engine 102 implemented on a server computer receives color measurement data 106 transmitted over a network. The color matching engine contains a software program comprising algorithms for colorant combinations of known colorants. The mathematical procedure utilized to calculate the amount of the colorants to be added (depending on the color of the target object) is known in the art. For example, the color measurement data may comprise color measurement data from a spectrophotometer analysis of a sample. The color matching engine 102 identifies an initial color formulation based on the color measurement data 106. The color matching engine 102 accesses historical color recommendation data from a historical match data store 108, where the historical match data store 108 contains color data that is based on previous color recommendations. The color matching engine 102 adjusts the initial color formulation based on the historical color recommendation data from the historical match data store 108 and transmits the adjusted color formulation as a color recommendation 104 from the server via the network. In one example, the color recommendation 104 is provided back to the historical match data store 108 for use as historical color recommendation data for providing future color recommendations.

Figure 2:
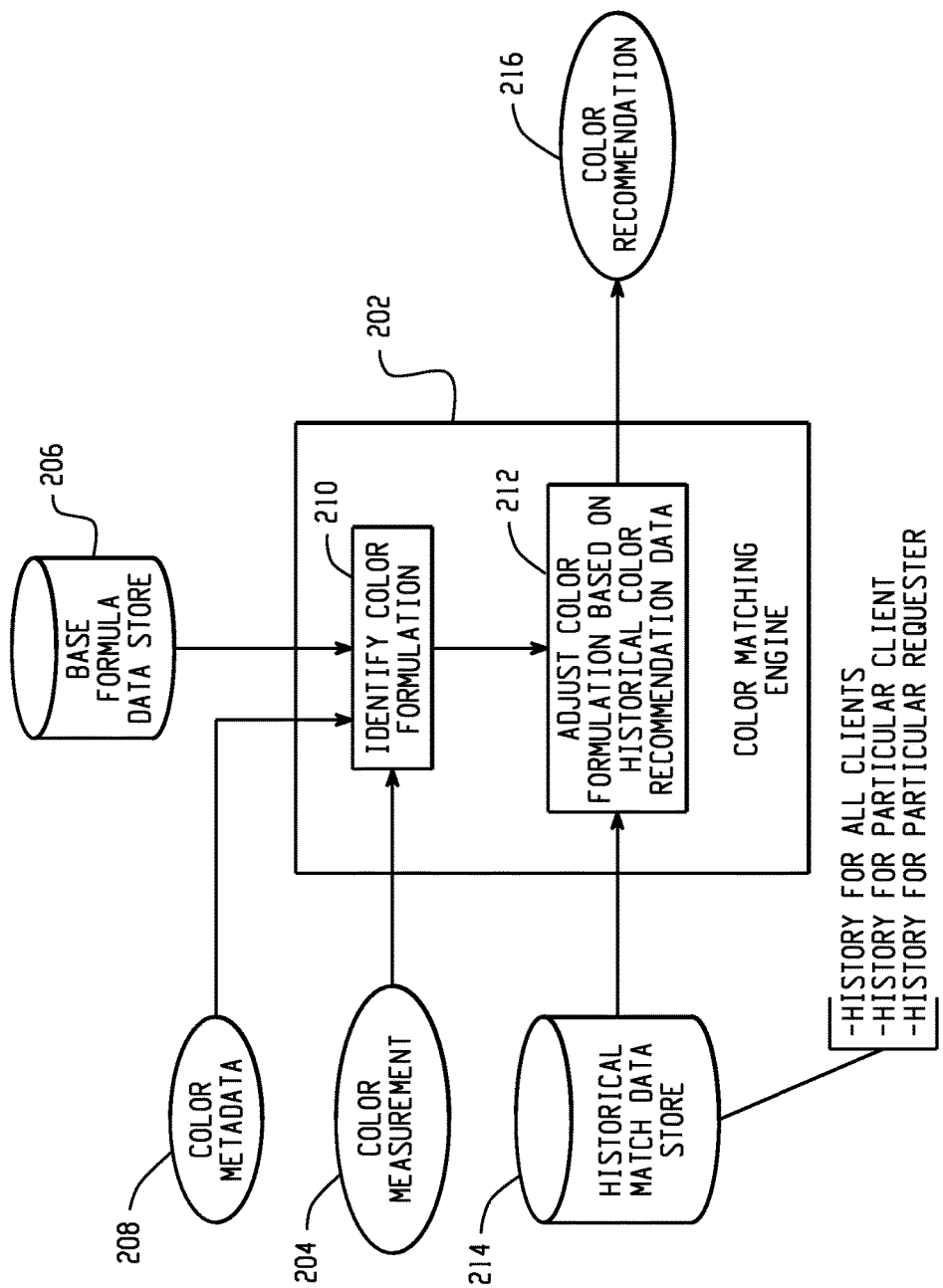
FIG. 2 is a block diagram depicting additional example details of color matching engine operations.

FIG. 2 is a block diagram depicting additional example details of color matching engine operations. The color matching engine 202 receives color measurement data 204 associated with a color to be matched. The color matching engine further receives data from a base formula data store 206 and color metadata 208 associated with the color sought to be matched. The color matching engine 202 uses this data 204, 206, 208 to identify an initial color formulation at 210. For example, the color formulation identification operation at 210 may seek to identify a color formulation that matches a particular target object previously identified in the system. In that example, the color metadata 208 comprises the name of the paint, or other information that identifies the supposed color of the paint to be matched. The color measurement data 204 comprises data that represents the observed color. The base formula data store 206 provides data associated with base colors from which additive can be incorporated to match the paint color. In this example, the identification at 210 may identify an initial formula (base color plus any additives) based on the color metadata (e.g., the identification at 210 may identify a stock formula for paint for the object, and color identified in the color metadata) 208. The identification at 210 then provides an adjustment to that stock formula based on the color measurement data 204. For example, the color measurement data 204 may indicate that the actual color of target object is slightly darker than specified. The identification at 210 adjusts the stock formula accordingly.

At 212 the color matching engine adjusts the color formulation based on historical color recommendation data from a historical match data store 214 to generate a color recommendation 216. The historical match data store 214 can contain historical color recommendation data at a variety of levels. For example, the historical match data store 214 can contain records associated with colors recommended to all clients. The adjustment at 212 can compare the color formulation identified at 210 with a history of color recommendations to see if the proposed formulation is a common proposal. For example, the paint associated with the make/model/color identified by the color metadata 208 may generally run a bit darker than the specification. Thus, it may be common to recommend a slightly darker shade as a color recommendation. Such a finding in the historical match data store 214 may confirm the color formulation identified at 210 or may suggest that further adjustment might be desirable.

The historical match data store 214 may also contain historical data at a client level. For example, the data store 214 may contain a history of color recommendations for a particular client and whether officials at that particular client have accepted the color recommendations or further adjusted from those recommendations. To achieve high client satisfaction, it may be a goal for the color matching engine 202 to provide a color recommendation 216 that the client is happy with on the first iteration, without requiring additional adjustment. Thus, in one example, logic at 212 may analyze the formulation identified at 210 in light of the color metadata (e.g., make/model/color of the vehicle) in further view of the historical match data from 214. If the historical data 214 notes that the formulation identified at 210 has previously been suggested to this client, and the client rejected that recommendation, requesting something lighter, then the logic at 212 may adjust the formulation in anticipation of the client's preferences.

The historical match data store 214 may even contain data at a lower level of granularity. For example, data may be stored at the individual user level. At 212, the color matching engine may consider past preferences of an individual user who is requesting the color recommendation. That user may tend to like a certain hue adjustment for yellow colors from what is dictated by the stock definition and color measurement data. By incorporating that preference at 212, the color recommendation 216 may be more likely to be acceptable to that employee.

Figure 3:
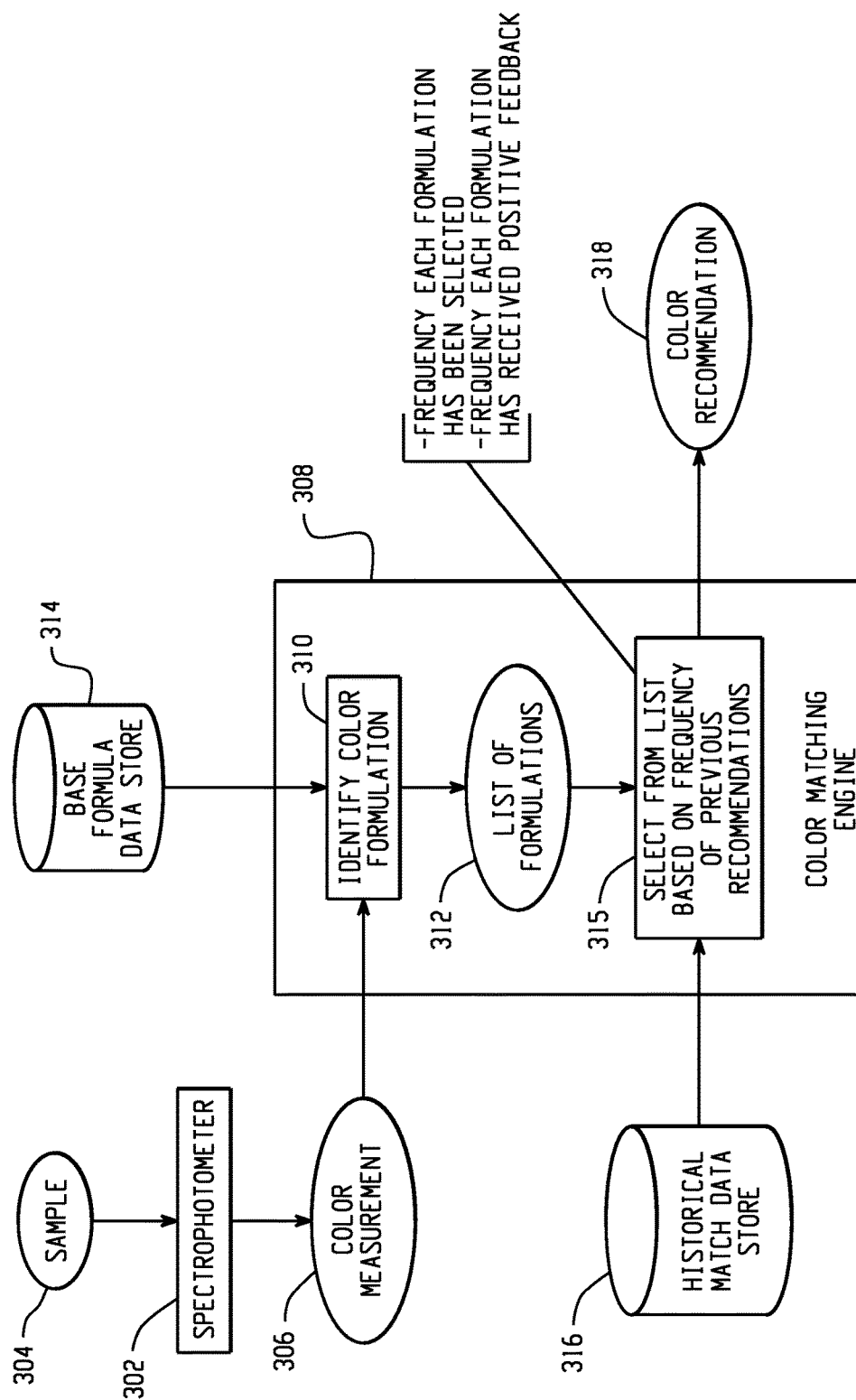
FIG. 3 is a diagram depicting a color matching engine producing a list of candidate formulations and selecting one of those candidates as a color recommendation.

FIG. 3 is a diagram depicting a color matching engine producing a list of candidate formulations and selecting one of those candidates as a color recommendation. A spectrophotometer 302 analyzes a sample 304 to generate color measurement data 306 that is provided to a color matching engine 308. At 310, the color matching engine 308 generates a list of candidate formulations 312 with reference to data from a base formula data store 314. In one example, the operations at 310 identify a number of base colors that have similar characteristics to the color measurement data 306.

Using a color formulation model, the color matching engine adjusts each of those base colors in an attempt to match the sample 304. The model at 310 may also generate a candidate formula from scratch that does not rely on a base color. The list of candidate formulations 312 is provided for selection at 315 based on a frequency of previous recommendations or other criteria. For example, the selection at 314 may access data from a historical match data store 316. Based on a number of times the candidate formulations 312 have been selected (e.g., selected overall, selected and accepted by a client), the color matching engine 314 selects a candidate formulation from the list 312 and outputs the selected formulation as the color recommendation 318.

Figure 4:
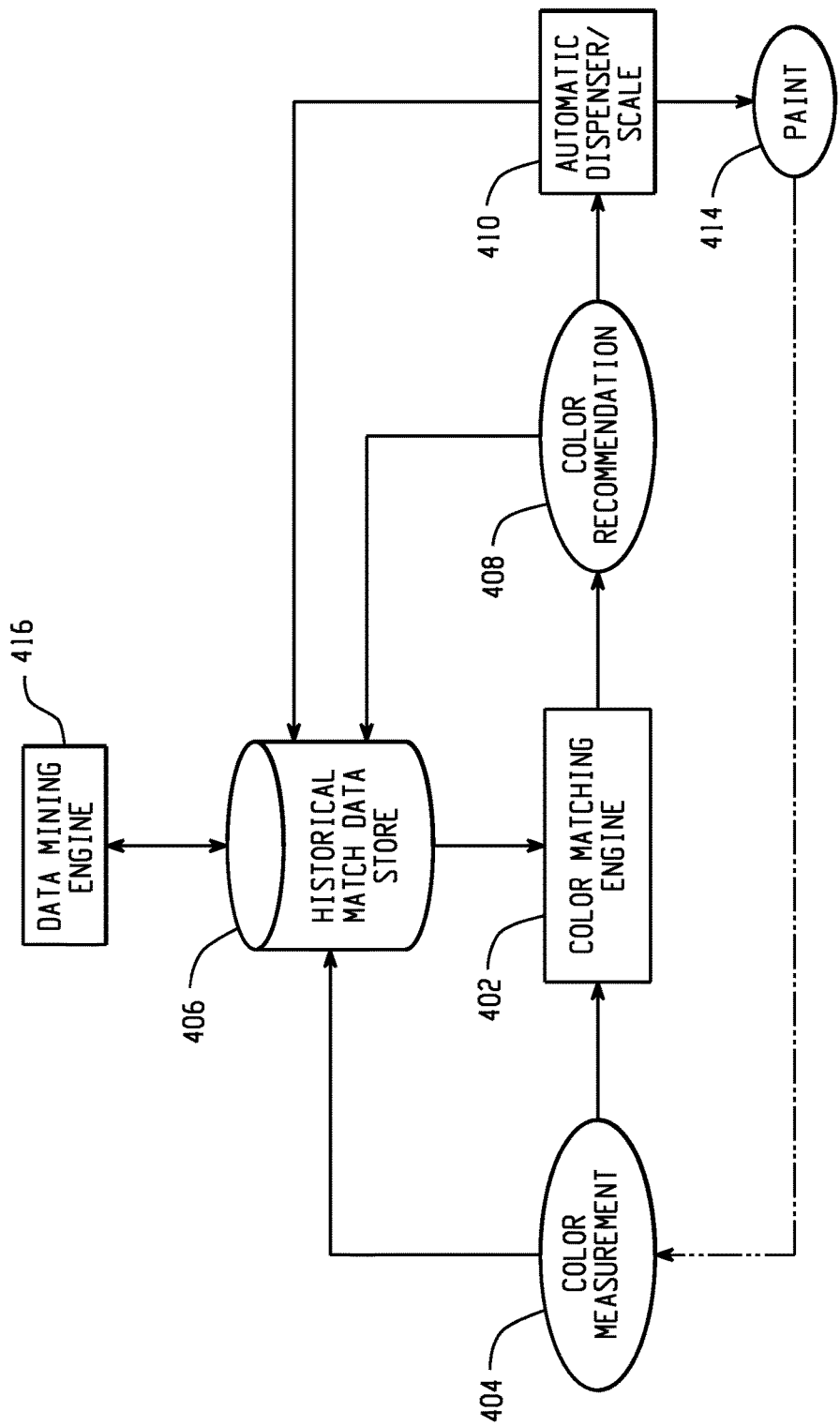
FIG. 4 is a block diagram depicting example collection of data in the historical match data store.

FIG. 4 is a block diagram depicting example collection of data in the historical match data store. A color matching engine 402 receives color measurement data 404 associated with a color to be matched. The color measurement data 404 is also provided to a historical match data store 406 directly or via the color matching engine 402 for use in subsequent color recommendations. The color matching engine 402 determines a color recommendation 408 based on the color measurement data 404 and data from the historical match data store 406. That color recommendation 408 is provided to the historical match data store 406 for use in subsequent recommendations. The color recommendation 408 is further provided to an automated dispenser/scale 410 that selects, dispenses, and weighs color additive based on the color recommendation 408 that can be added to a base color to generate matched paint 414. The dispensing and weighing may be based on the color recommendation 408 and an amount of paint to which the additive is to be mixed (e.g., the client wishes to generate 50 gallons of matching paint). The dispenser/scale 410 may also provide feedback to the historical match data store 406. While the dispenser/scale 410 may initially dispense additive based on the color recommendation 408, a client may adjust the amounts of additive that he actually adds to the paint based upon personal preference. Such adjustments can be forwarded from the dispenser/scale 410 to the historical match data store 406 for use in making future recommendations. For example, future recommendations can take into account the client's preferences in providing an initial recommendation, such that the client is inclined to make fewer post-recommendation adjustments.

The paint matching process can be an iterative procedure. Colorant is mixed with paint to create a paint product 414. That paint can then be analyzed, such as via a spectrophotometer, to generate a second color measurement 404. That color measurement 404 can be compared to a color measurement for a sample to be matched to determine whether the paint 414 is sufficiently close to the sample. If the paint 414 is not sufficiently well matched, the color matching engine 402 can provide a further recommendation 408 for adjusting the previously adjusted paint 414, or the color matching engine 402 may provide a color recommendation 408 for adjusting a new batch of paint (e.g., in some implementations rules may exist as to the number of times a batch of paint may be adjusted).

A data mining engine 416 is also responsive to the historical match data store 406. The data mining engine 416 analyzes data from previous operations of the color matching engine 402 to determine patterns in client preferences. The patterns may be determined at an overall level, a client level, or an individual employee level. The data mining engine 416 may analyze a number of times a particular formula is recommended in relation to the number of times that particular formula is accepted by a client to determine a popularity and correctness of that particular formula. The particular formula may be associated with metadata that was inputted during an operation that resulted in recommendation of the particular formula (e.g., make/model/color of a vehicle) to identify a best candidate for recommending when that metadata is presented. A user's adjustments at a dispenser/scale 310 may be analyzed over a history of recommendations for that user to determine user preferences for such attributes as lightness, darkness, hue, saturation, luminance, red content, yellow content, green content, and blue content. The patterns and preferences determined by the data mining engine 416 are stored in the historical match data store 406 for use by the color matching engine 402 in providing color recommendations 408 with the goal of providing an acceptable color recommendation in a first iteration, without need for further adjustment.

Figure 5:
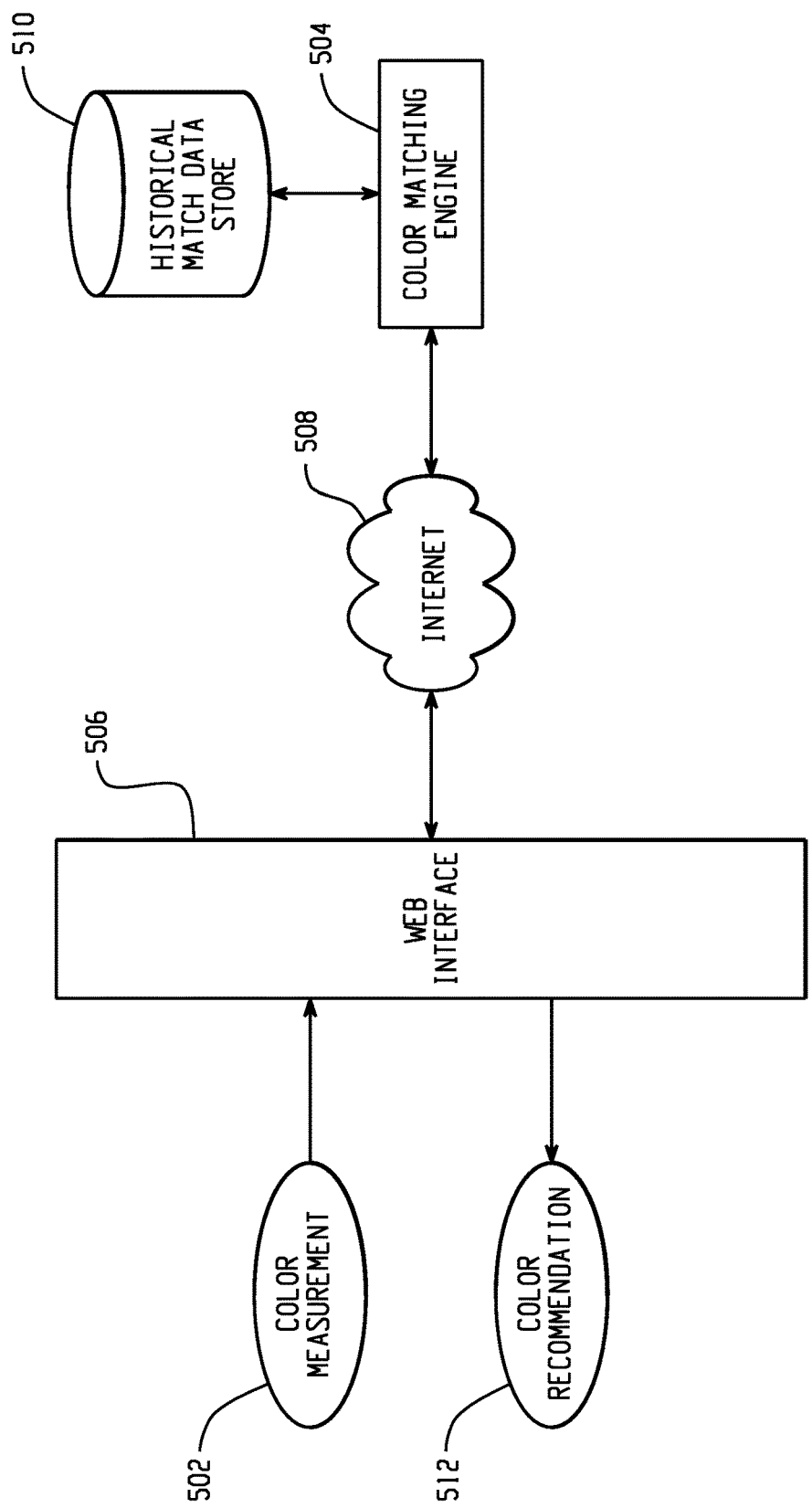
FIG. 5 is a block diagram depicting a color matching engine accessible over a network, such as the Internet.

FIG. 5 is a block diagram depicting a color matching engine accessible over a network, such as the Internet. A client proves color measurement data 502 to the color matching engine 504 through a web interface 506, such as a web browser, mobile device application, or other client software. By utilizing a thin web interface, client software downloads can be limited, preserving bandwidth and limiting most software modifications to the server-side color matching engine 504. The color measurement data 502 is provided by the web interface 506 to the color matching engine 504 through a network 508, such as the Internet. The color matching engine accesses a historical match data store 510 to generate a color recommendation 512. The color matching engine 504 transmits the color recommendation 512 through the network 508 and the web interface 506 to the client, where the recommendation 512 can be utilized in mixing paint, such as via a software/hardware connection to an additive dispenser/scale.

A color matching engine provides a number of opportunities for expanding color matching capabilities through the central storage of color matching data. For example, a color matching engine can be utilized to provide cross-resin color matching opportunities that can open up a variety of new color options to a client. In one embodiment, a color matching engine that is facilitating requests for interior wall paint color matching has access to color data for automobiles and other surfaces that utilize wholly different resin formulas than interior wall paint. Using this cross-resin-type data, a client can select their favorite car paint color (e.g., Jaguar® red) for a living room. The color matching engine accesses the car paint color data to generate a color recommendation. The color matching engine may adjust that color recommendation to account for paint property differences based on the resin type (e.g., based on experiences from prior, similar cross-resin-recommendation feedback) in order to provide the client with a good match.

Figure 6:
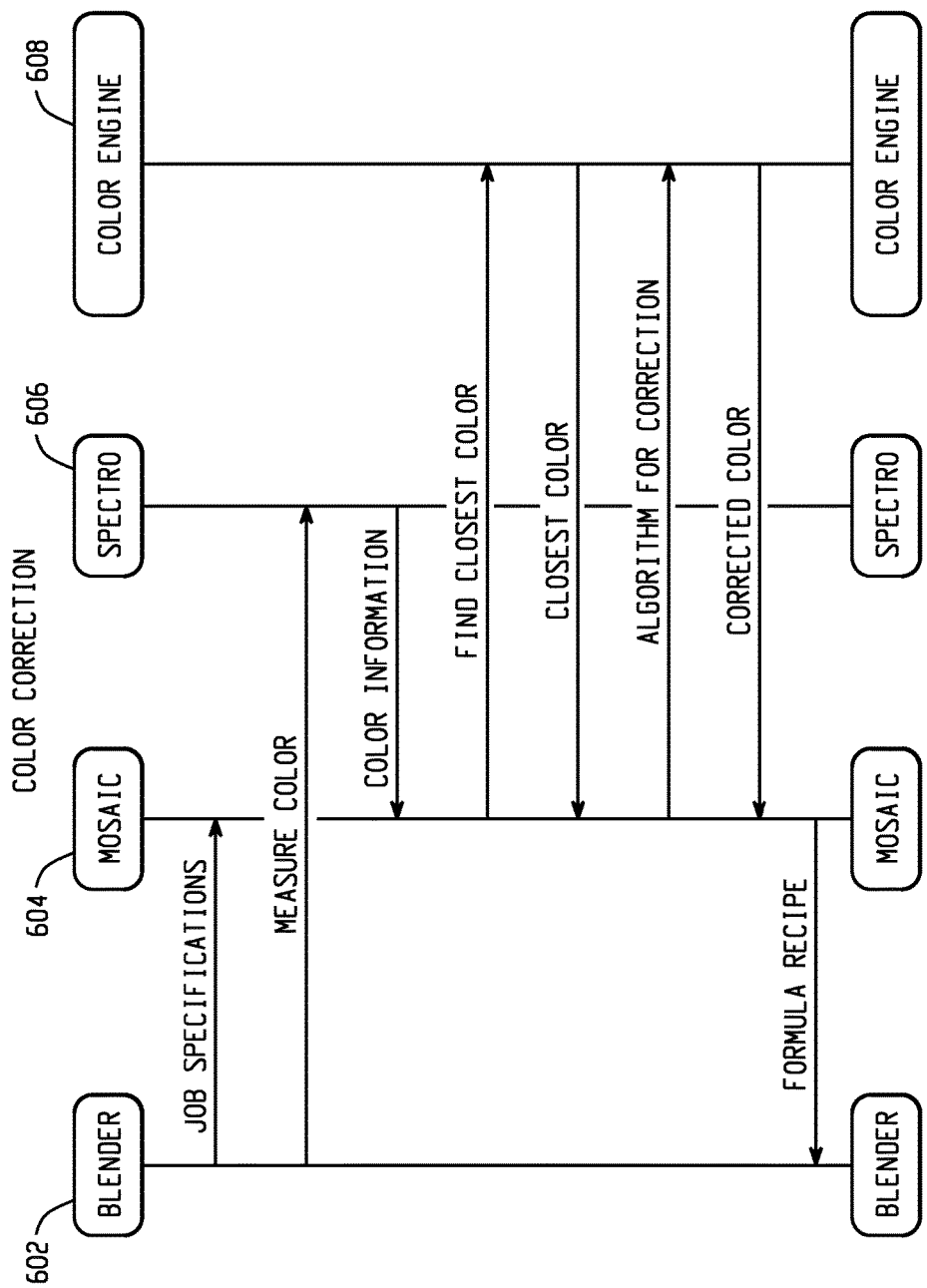
FIG. 6 is a data flow diagram depicting data transactions in a system for adjusting color.

FIG. 6 is a data flow diagram depicting data transactions in a system for adjusting color. A user 602 transmits job specifications, such as a client/user identifier and color metadata to a color matching engine manager 604. The user 602 provides a sample to be matched to a spectrophotometer 606 which measures color and provides color measurement data to the color matching engine manager 604. The color matching engine manager 604 accesses a color engine 608 that determines a closest color based on the color information provided by the spectrophotometer 606. The color engine 608 further determines any adjustments that should be made to the closest base color to best match the requested color. The color matching engine manager 604 may then adjust that corrected color based on historical color recommendation data before returning a recommended formula recipe to the user 602.

Figure 7:
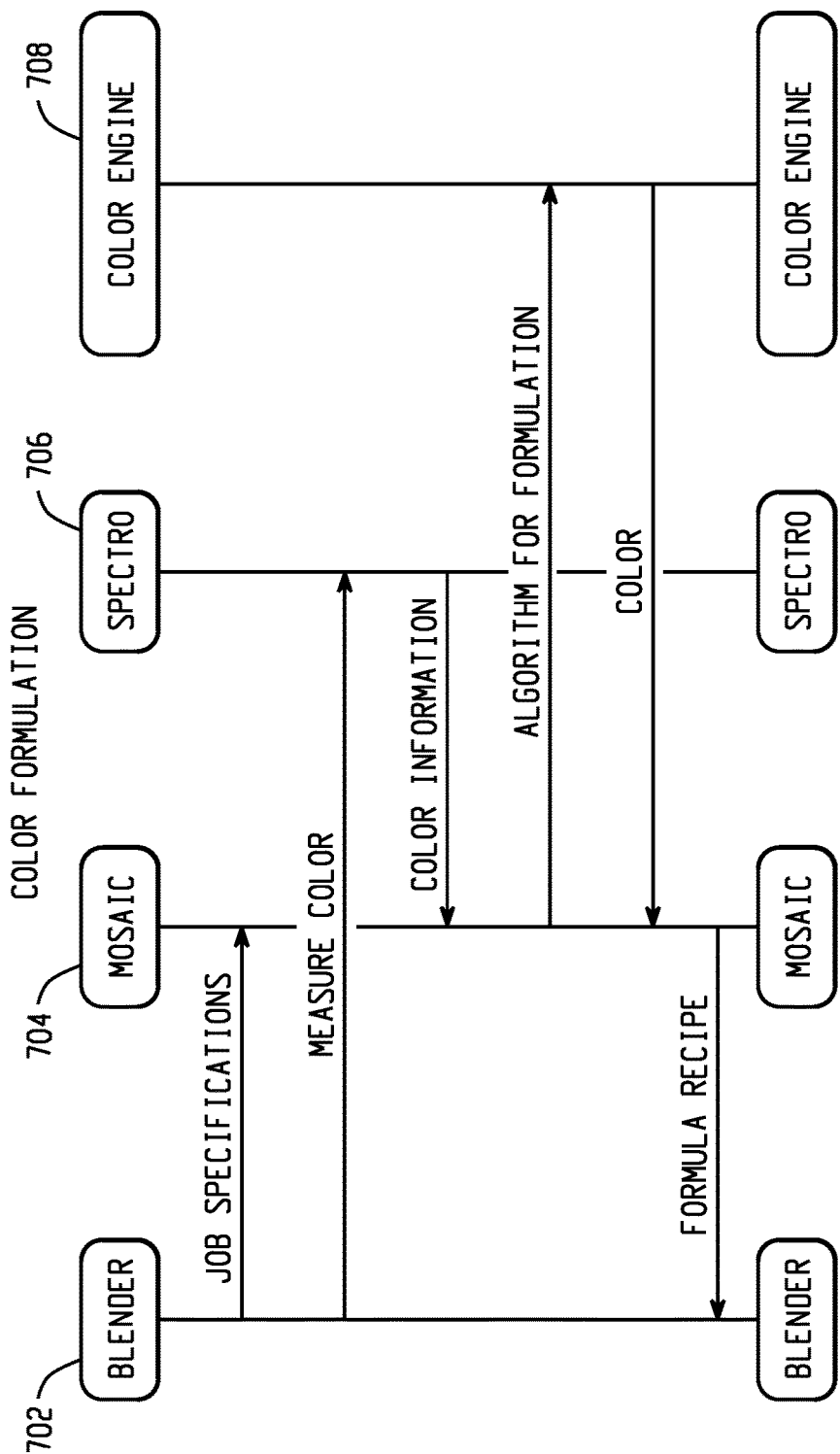
FIG. 7 is another data flow diagram depicting data transactions in a system for formulating color.

FIG. 7 is another data flow diagram depicting data transactions in a system for formulating color. A user 702 transmits job specifications, such as a client/user identifier and color metadata to a color matching engine manager 704. The user 702 provides a sample to be matched to a spectrophotometer 706 which measures color and provides color measurement data to the color matching engine manager 704. The color matching engine manager 704 accesses a color engine 708 that determines a color formulation that matches the color measurement information. The color matching engine manager 704 may then adjust that color formulation based on historical color recommendation data before returning a recommended formula recipe to the user 702.

Figure 8:
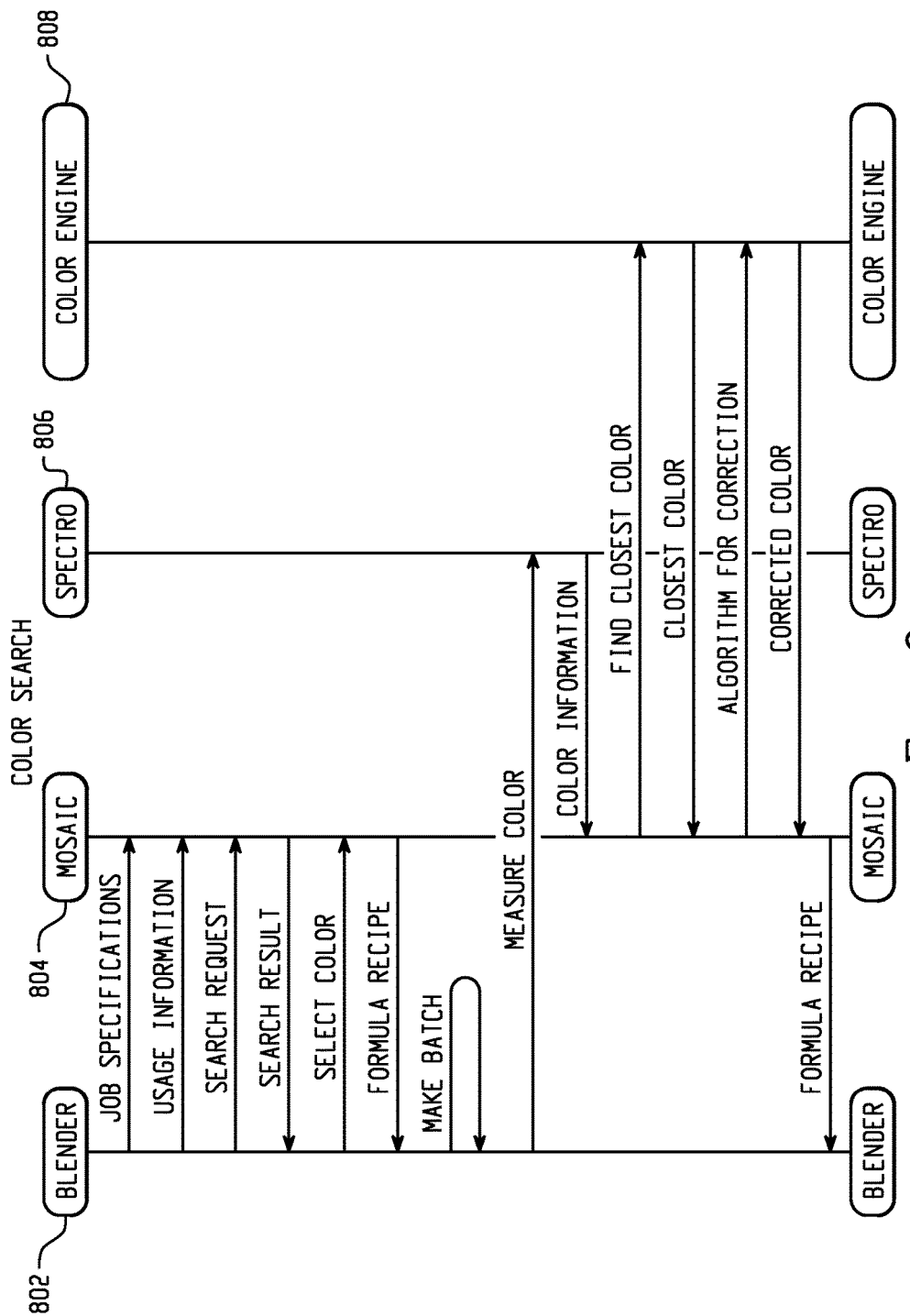
FIG. 8 is a further data flow diagram depicting data transactions in a system for finding and adjusting color.

FIG. 8 is a further data flow diagram depicting data transactions in a system for finding and adjusting color. A user 802 provides job specification, usage information, and search request data to a color matching engine manager 804, where that data functions as metadata that is used by the manager 804 in finding a set of color search results. The manager 804 provides a list of color results to the user, such as via a network such as the Internet, for selection by the user 802. The user 802 selects a color from the results list and is provided the formula for that color. The user 802 makes a batch of that color, such as via a dispenser/scale that automatically receives the formula recipe and dispenses the called for amounts of additive.

The user 802 then provides a sample to a spectrophotometer 806 for analysis. Measured color information is provided from the spectrophotometer 806 to the manager 804, which is forwarded to a color manager 808. The color manager finds a closest color and executes an algorithm for adjusting that color so that the adjusted color matches the specification for the color selected by the user 802 from the search results. The corrected color formula is provided to the manager 804, which may further adjust the formula based on known preferences of the user 802. The user 802 is then provided the formula recipe for adjusting the already made batch or preparing a new batch of the desired color.

Figure 9:
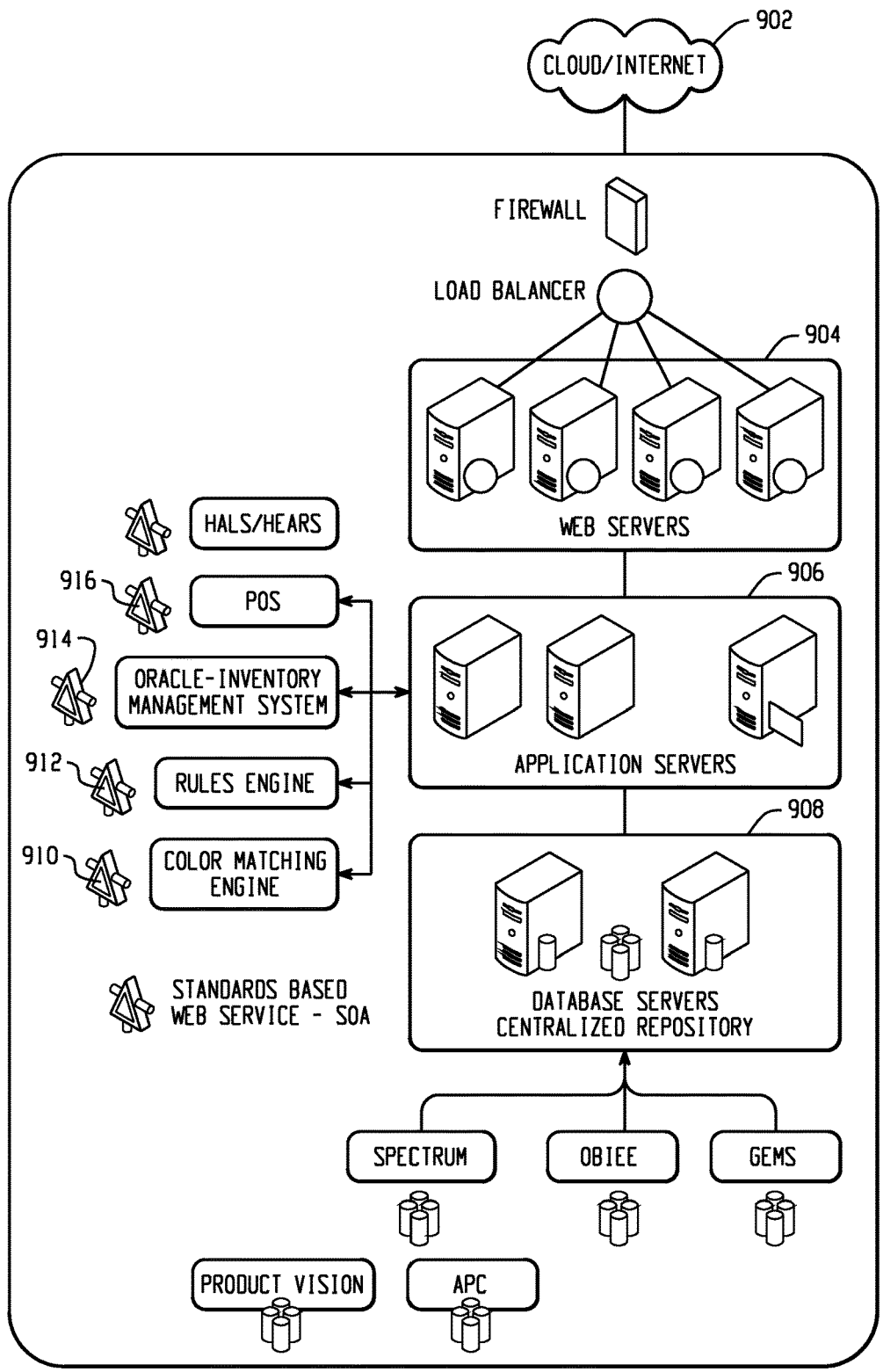
FIGS. 9 and 10 depict a modular implementation of a color matching engine where a plurality of server based modules provide paint color recommendations to remote based client computers via a cloud or Internet environment.
Figure 10:
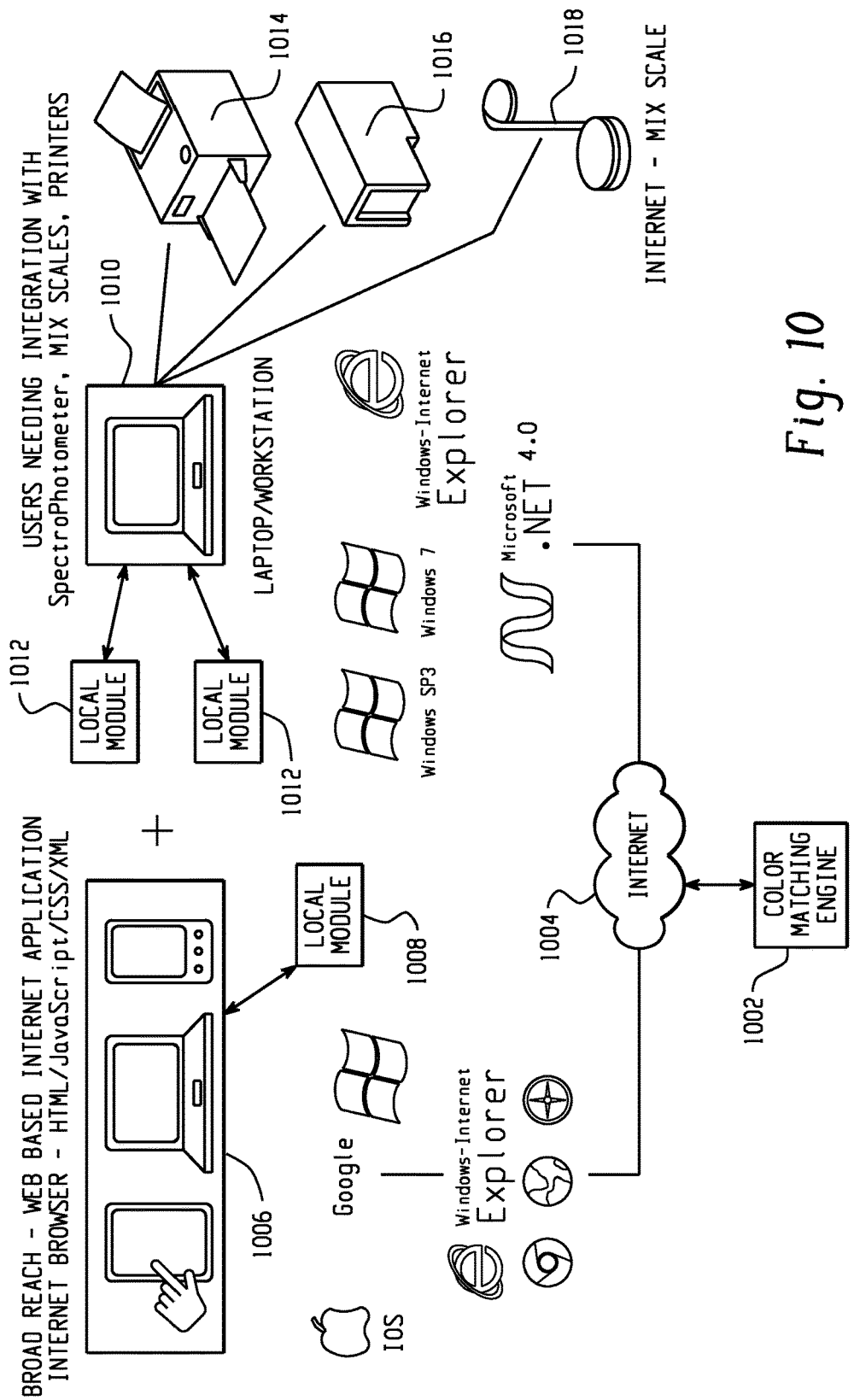

FIGS. 9 and 10 depict a modular implementation of a color matching engine where a plurality of server based modules provide paint color recommendations to remote based client computers via a cloud or Internet environment. FIG. 9 depicts a server-side representation of modules that are made accessible via communications on a cloud/Internet environment 902. In one example, data is received from a client via the network 902 and that data traverses a firewall and load balancer to reach one or more web servers 904. A web server 904 to which the communication is directed parses the communication and determines whether a paint color recommendation request has been received. When a web server 904 determines that such a recommendation request has been received, that recommendation is forwarded to one of a plurality of color matching engine application servers 906. The application servers 906 interface with a plurality of server based modules to provide a requested paint color recommendation.

For example, in the depiction of FIG. 9, the application servers 906 interface with a plurality of database modules operating one or more database servers 908. Such database modules may retain a variety of different types of data. For example a formulation workflow database module may contain a plurality of base color formulas, and a recommendation database module may contain historical color recommendation data. Other database modules that can be interfaced can include databases directed to, but not limited to, business intelligence, employee/user files, manufacturing processes, product information data sheets, to name a few. The application servers 906 command searches of these database modules as necessary to develop a paint color recommendation. The application servers 906 further have access to one or more application modules, such as a color matching engine 910 configured to adjust a base color formula based on color measurement data received from a client via the cloud/Internet environment 904. The application modules 902 further include a rules engine 912, where the rules engine is configured to adjust a color formula, such as the adjusted target base color formula as a function of the base resin and application requirements, as determined by the color matching engine 910. In one example, a rule utilized by the rules engine 912 dictates a further adjustment of the adjusted target base color formula based on a client preference accessed from a database module 908 that contains historical color recommendation data. For example, the rules engine 912 may adjust a formula based on historical preferences of a client who is associated with a current request in an attempt to satisfy that client's tastes in a limited number of iterations.

The modules provided for access can vary substantially and access to those modules can be regulated based on identities of requesting parties. For example, access to an inventory management module 914 may be provided to an internal user an organization providing paint or paint additives while no access or limited access to such data may be provided to an extra-organization client (e.g., an internal client may be provided access to how much of a particular color additive is available in inventory, while an external client may only be provided information regarding whether that color additive is in stock or out of stock). As another example, certain parties may have access to a point of sale module 916, while other clients whose employment does not require point of sale access would be excluded from accessing the point of sale module 916.

FIG. 10 depicts the architecture of the system in certain embodiments. The broad reach of the system is enabled through an internet network device, such as through a cloud/Internet environment 1004 to client devices. Certain client devices 1006, such as tablet computers, smart phones, and other mobile devices, are provided graphical user interfaces via the cloud/Internet environment 1004 to interact with the color matching engine 1002. These client devices 1006 may interact with the color matching engine 1002 that is operatively attached to capture color measurement data of a target sample and input into any of the various modules for performing a variety of tasks, such as looking up details of paint formulations, viewing details of previous color recommendations, and entering data for color recommendation requests. In some implementations, the client devices 1006 interact with the internet network device 1002 using base software of the client devices 1006, such as web browsers. In other examples, certain local modules 1008 are installed on the client devices 1006, such as a custom user interface module.

Other client devices 1010 may have additional local modules 1012 loaded thereon. For example, a client laptop or workstation 1010 may be connected to local hardware peripheral devices for capturing color measurement data for transmission to the internet network device 1002 or for acting on paint color recommendation data received from a color matching engine module 1022. In such an implementation, the client device 1010 may be have local modules 1012 installed thereon (e.g., driver modules) to facilitate communications between the peripheral devices and the client device 1010 and further to the internet network device 1002. Users' peripheral devices that can be integrated can include spectrophotometers, printers, dispensers, scales and the like. In one example, the peripheral devices include a printer 1014 for outputting a paint color recommendation received from the color matching engine, a spectrophotometer 1016 for capturing color measurement data for transmission to the color matching engine 1022 and a mix scale 1018 configured to receive paint color recommendation data from the color matching engine 1022 and to weight appropriate amounts of paint additive for inclusion in a batch of paint having its color adjusted.

In addition to the modules depicting in the cloud environment of FIGS. 9 and 10, certain implementations may include additional/different modules as well. In one embodiment, modules can be designed to include specific data such as paint quality, published formulas, color requests, color management, order management, user/customer management, user preferences, batch management (such as mix history, bulk production, etc.), spectral data and graphs, cost management, forecasting and reporting information, regulatory information interfaces, color matching engine, external device integration (such as dispensers, scales, printers, etc.), and the like, for any functionality, to name a few, where end users may access the modules as needed and permitted.

Figure 11A:
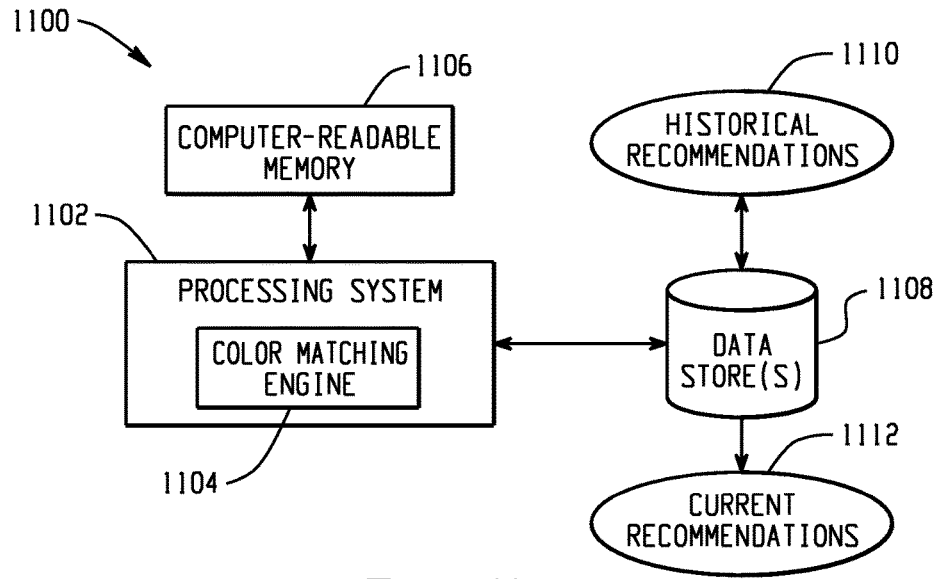
FIGS. 11A, 11B, and 11C depict example systems for use in implementing a color matching engine.
Figure 11B:
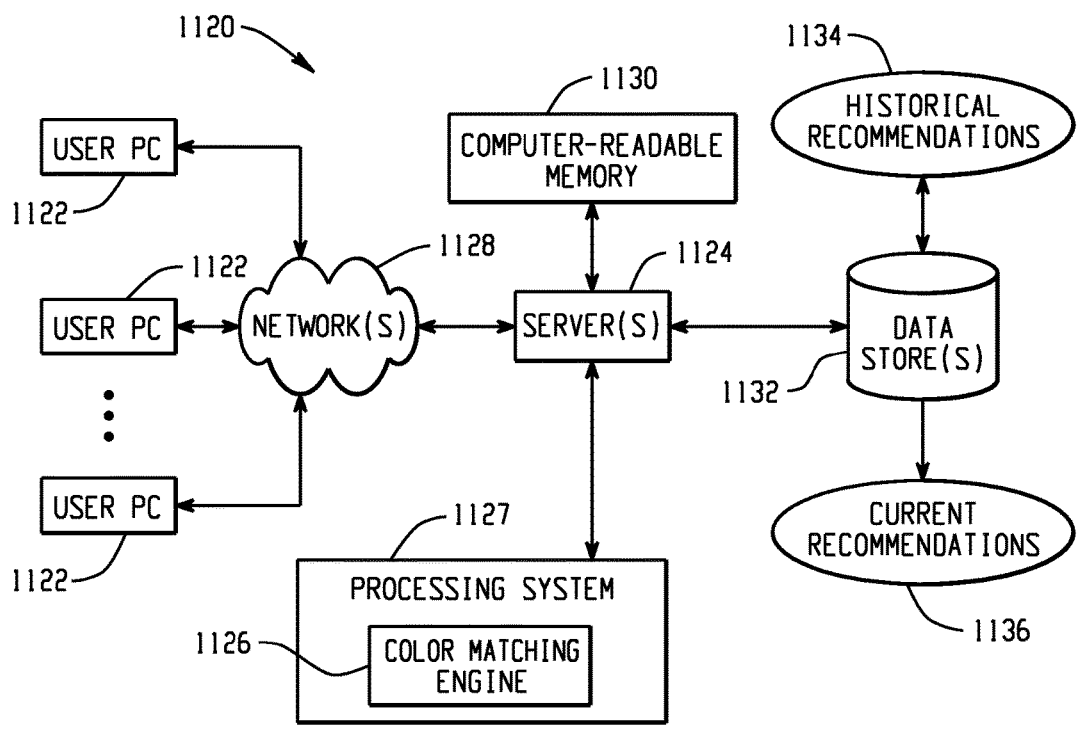
Figure 11C:
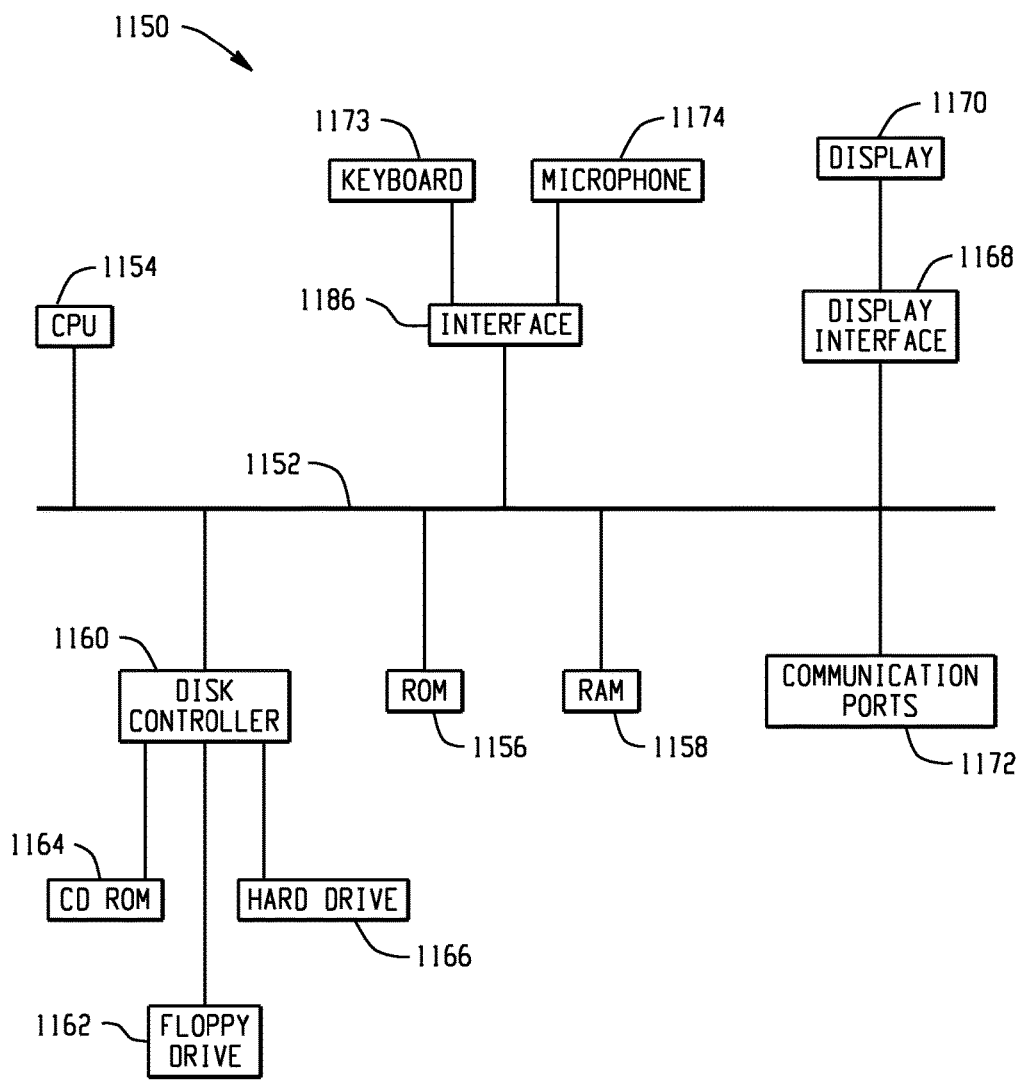

FIGS. 11A, 11B, and 11C depict example systems for use in implementing a color matching engine. For example, FIG. 11A depicts an exemplary system 1100 that includes a stand alone computer architecture where a processing system 1102 (e.g., one or more computer processors) includes a color matching engine 1104 being executed on it. The processing system 1102 has access to a computer-readable memory 1106 in addition to one or more data stores 1108. The one or more data stores 1108 may contain historical color recommendation data 1110 as well as current color recommendation data 1112.

FIG. 11B depicts a system 1120 that includes a client server architecture. One or more user PCs 1122 accesses one or more servers 1124 running a color matching engine 1126 on a processing system 1127 via one or more networks 1128. The one or more servers 1124 may access a computer readable memory 1130 as well as one or more data stores 1132. The one or more data stores 1132 may contain historical color recommendation data 1134 as well as current color recommendation data 1136.

FIG. 11C shows a block diagram of exemplary hardware for a standalone computer architecture 1150, such as the architecture depicted in FIG. 11A, that may be used to contain and/or implement the program instructions of exemplary embodiments. A bus 1152 may serve as the information highway interconnecting the other illustrated components of the hardware. A processing system 1154 labeled CPU (central processing unit) (e.g., one or more computer processors), may perform calculations and logic operations required to execute a program. A processor-readable storage medium, such as read only memory (ROM) 1156 and random access memory (RAM) 1158, may be in communication with the processing system 1154 and may contain one or more programming instructions for performing the method of implementing a color matching engine. Optionally, program instructions may be stored on a computer readable storage medium such as a magnetic disk, optical disk, recordable memory device, flash memory, or other physical storage medium. Computer instructions may also be communicated via a communications signal, or a modulated carrier wave.

A disk controller 1160 interfaces one or more optional disk drives to the system bus 1152. These disk drives may be external or internal floppy disk drives such as 1162, external or internal CD-ROM, CD-R, CD-RW or DVD drives such as 1164, or external or internal hard drives 1166. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1160, the ROM 1156 and/or the RAM 1158. Preferably, the processor 1154 may access each component as required.

A display interface 1168 may permit information from the bus 1156 to be displayed on a display 1170 in audio, graphic, or alphanumeric format. Communication with external devices may optionally occur using various communication ports 1172.

In addition to the standard computer-type components, the hardware may also include data input devices, such as a keyboard 1173, or other input device 1174, such as a microphone, remote control, pointer, mouse and/or joystick.

In one embodiment of the disclosure, the color matching systems described herein are grouped into different modules to support global color formulation and color publishing processes across all coating technologies and substrates. Though the processes of the color matching are different, the look, feel and overall user experience is substantially the same, regardless of the user's coating requirements and specifications. The various modules are designed to be coupled and easily integrated into the system such that a user's specific requirements can be achieved. In one embodiment, modules can be designed to include specific data such as paint quality, published formulas, color requests, color management, order management, user/customer management, user preferences, batch management (such as mix history, bulk production, etc.), spectral data and graphs, cost management, forecasting and reporting information, regulatory information interfaces, color matching engine, external device integration (such as dispensers, scales, printers, etc.), and the like, for any functionality, to name a few. End users may access the modules as needed.

The module relating to the formulation processes of the color management system can be integrated with local devices such as spectrophotometers, weighing scales, dispensers, printers, and the like. Information achieved from these devices will be saved and processed into the central repository, as needed (e.g. a spectral reading for a Target/Standard can be saved into the central color repository.

The color management system can also be integrated with environmental, regulatory and compliance systems, business intelligence systems, employee systems, manufacturing systems, formulation workflow systems, and the like, for generating MSDS, product data sheets and the like.

Figure 12:
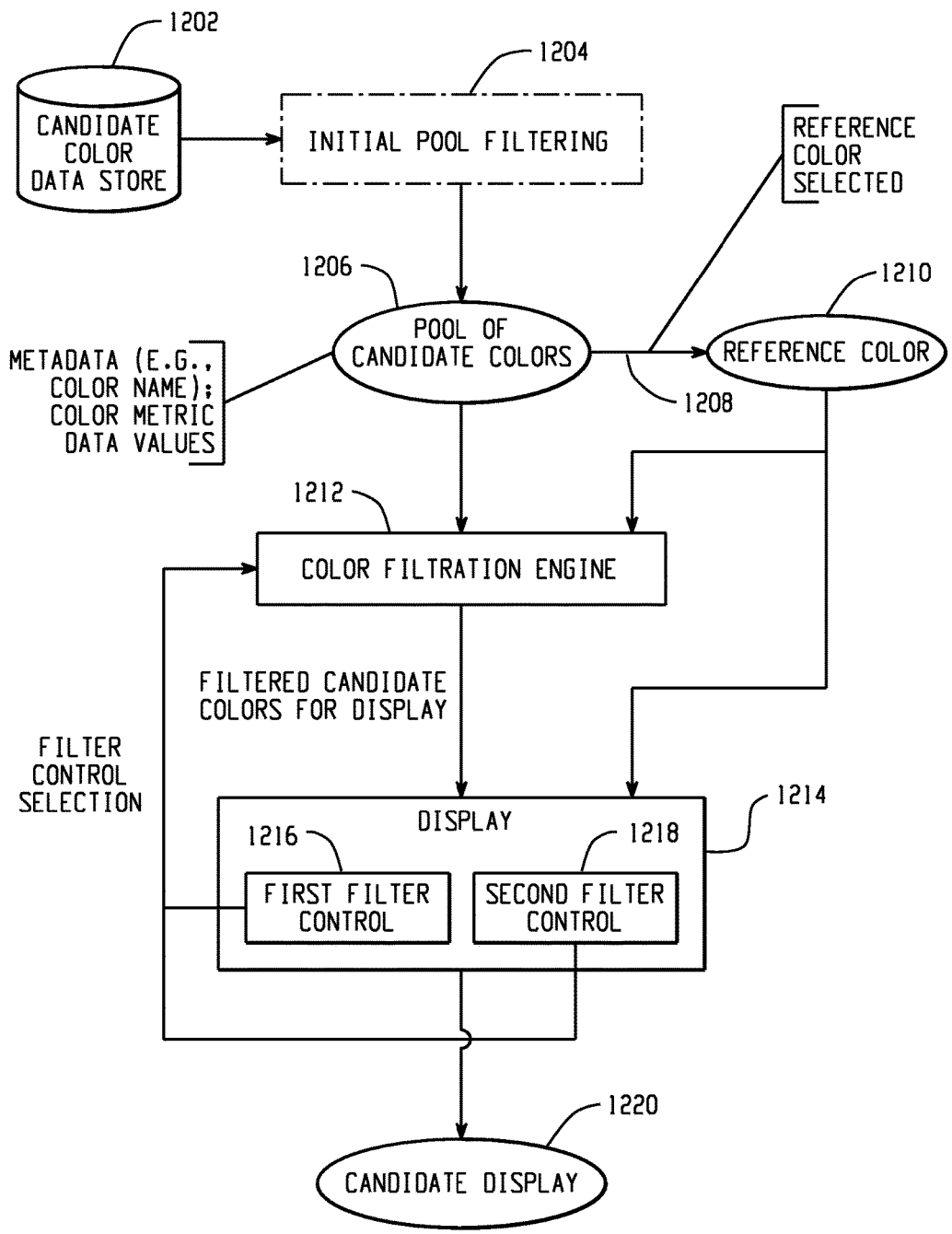
FIG. 12 is a block diagram depicting a system for providing a color identification display that provides a filtered list of colors for selection.

In one embodiment of the disclosure, a system includes a color filtration engine configured to identify a desirable color from a pool of candidate colors. FIG. 12 is a block diagram depicting a system for providing a color identification display that provides a filtered list of colors for selection. A data store 1202 containing data and/or metadata associated with a universe of candidate colors is accessed. For each color, the data store 1202 contains metadata such as color name, color type, color category as well as color data that includes a color formula and color parameter data such as lightness, hue, saturation, finish, gloss, appearance, graininess, sparkle, hiding, and color content. At 1204, an initial filtering of the pool of candidate colors from the data store 102 may be performed to generate the pool of candidate colors at 106 for presentation to the user. The initial filtering at 1204 can be based on one or more of the parameters stored for each of the colors in the data stores. For example, a user may specify a paint type, such as automotive or masonry paint to limit the initial pool of candidate colors 1206 for consideration.

At 1208 a reference color 1210 is selected. In one embodiment, the reference color 1210 is selected from a listing of colors in the pool of candidate colors 1206 that is accessed following the initial pool filtering at 1204. The reference color 1210 and each of the colors in the pool of candidate colors 1206 include common data or metadata values for one or more data types (e.g., hue, saturation, lightness). A color filtration engine 1212 provides a graphical user interface for facilitating location of a desirable color based on differences from a selected reference color on a display 1214. In one embodiment, the display includes a depiction of data and/or metadata associated with the reference color 1210, such as a color name, a formula name or number, a formula version, a date associated with the formula, a formula designer identifier, a color quality, or a cost.

In one use example, the display includes one or more filter control 1216, 1218 that facilitate filtering a plurality of candidate colors from the pool of candidate colors based on user interactions with the filter controls 1216, 1218. In one embodiment, the first filter control is associated with a lightness attribute, where a left side of the first filter control 1216 enables filtering of the plurality of candidate colors to display colors that are darker than the reference color 1210 and a right side of the first filter control 1216 enables display of only candidate colors that are lighter than the reference color 1210. In that example, a left side of the second filter control 1218 enables filtering of the plurality of candidate colors to display colors that are less saturated than the reference color 1210, while the right side of the second filter control 1218 enables filtering of the plurality of candidate colors to display colors that are more saturated than the reference color 1210.

The plurality of candidate colors from the pool of candidate colors that remain after any initial filtering at 1204 and any filtering via controls 1216, 1218 are displayed, as indicated at 1220. User interactions with the filter controls 1216, 1218 are provided to the color filtration engine 1212 for application of the desired filters, where the color filtration engine 1212 provides an updated filtered candidate color set to the display 1214. Filters can be applied individually or concurrently in a cascading fashion.

FIG. 13 is a display depicting a pool of candidate colors, such as after an initial pool filtering. In one embodiment, FIG. 13 displays colors after an initial filtering commanding display of gray colors having an automobile finish. A graphical user interface includes a listing of candidate colors available for selection as a reference color. Each row of the display is associated with a particular candidate color. Certain data is displayed for each listed color including a formula name, a color name, a formula number, a product with which the color is associated, a color definition date, and a field indicating whether a color chip is available for that color. The color chip indication lets a user know whether a physical sample of the color in a dry state can be accessed. Such a color chip can enable the user to make initial comparisons between a limited set of physical samples to select a reference color that most closely matches a desired color. The user can then use the filter controls, as described further below, to find a color that varies from the selected reference color as desired by the user. A user selects a reference color from the display of FIG. 13, such as by selecting a "Compare" link or a formula link in the row of the desired reference color.

Figure 14:
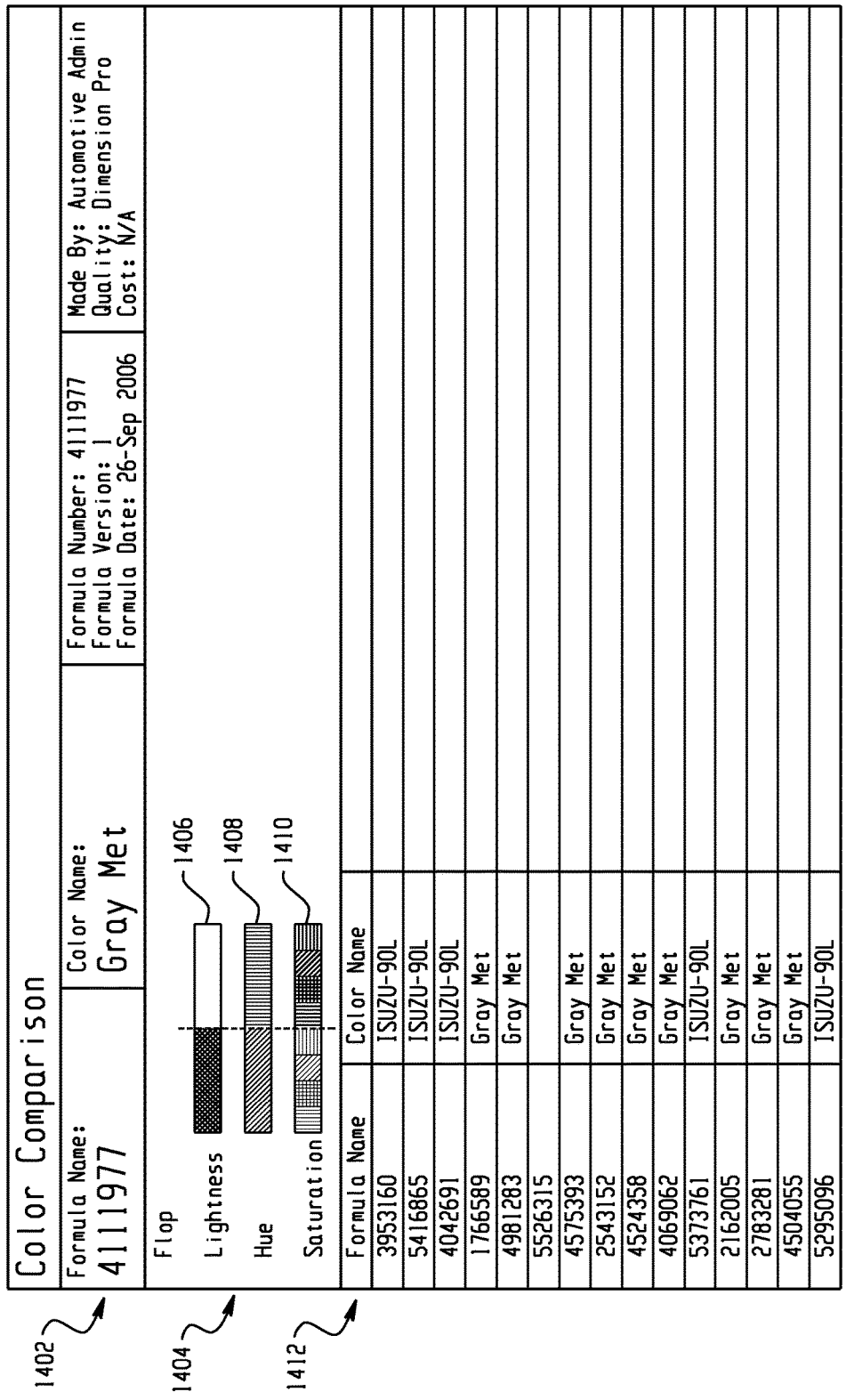
FIG. 14 depicts an example display provided after selection of a reference color.

FIG. 14 depicts an example display provided after selection of a reference color. The display of FIG. 14 includes a top portion 1402 that includes metadata associated with the selected reference color. The metadata includes a formula name, a color name, a formula number, a formula version, a formula data, a formula designer identifier, and a formula cost. An intermediate portion 1404 of the display includes three filter controls, a lightness filter 1406, a hue filter 1408, and a saturation filter 1410. In the example of FIG. 14, none of these filter controls 1406, 1408, 1410 have been activated. A bottom portion 1412 of the display provides a listing of remaining candidate colors from the pool of colors. In the example of FIG. 14, where no filter controls 1406, 1408, 1410 have been applied, the bottom portion 1412 lists all candidate colors from the pool of candidate colors that remain after any initial filtering was applied. The display of FIG. 14 lists a first 15 remaining candidate colors. A user can select one of the listed candidate colors for access to further information, selection for manufacture, or other interaction.

Figure 15:
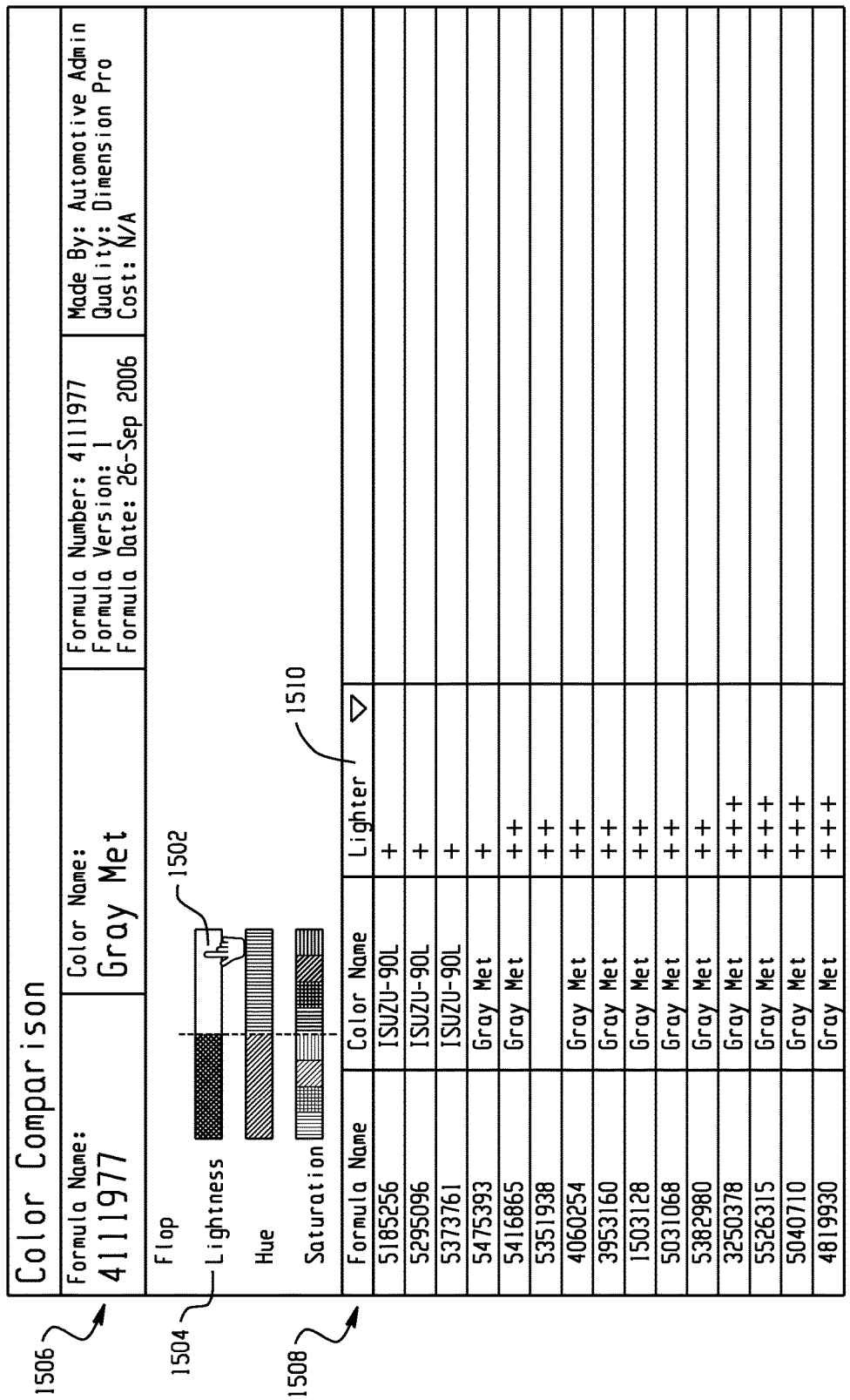
FIG. 15 depicts the example display following selection of a "lighter" side of a first filter control associated with the lightness color metric.

FIG. 15 depicts the example display following selection of a "lighter" side of a first filter control associated with the lightness color metric. By selecting the right side 1502 of the lightness filter control 1504, the user has indicated a desire to see only candidate colors that are lighter than the selected reference color, described at the top portion 1506 of the display. (Selection of the left side of the lightness filter control 1504 would result in display of only candidate colors that are darker than the reference color.) The color filtration engine updates the bottom portion 1508 of the display to display only candidate colors that are lighter than the selected reference color. The display of FIG. 15 includes a column at 1510 that indicates a magnitude of lightness difference between each of the listed candidate colors and the reference color, with one "+" indicating a small difference and additional "+"s indicating larger degrees of lightness difference.

Figure 16:
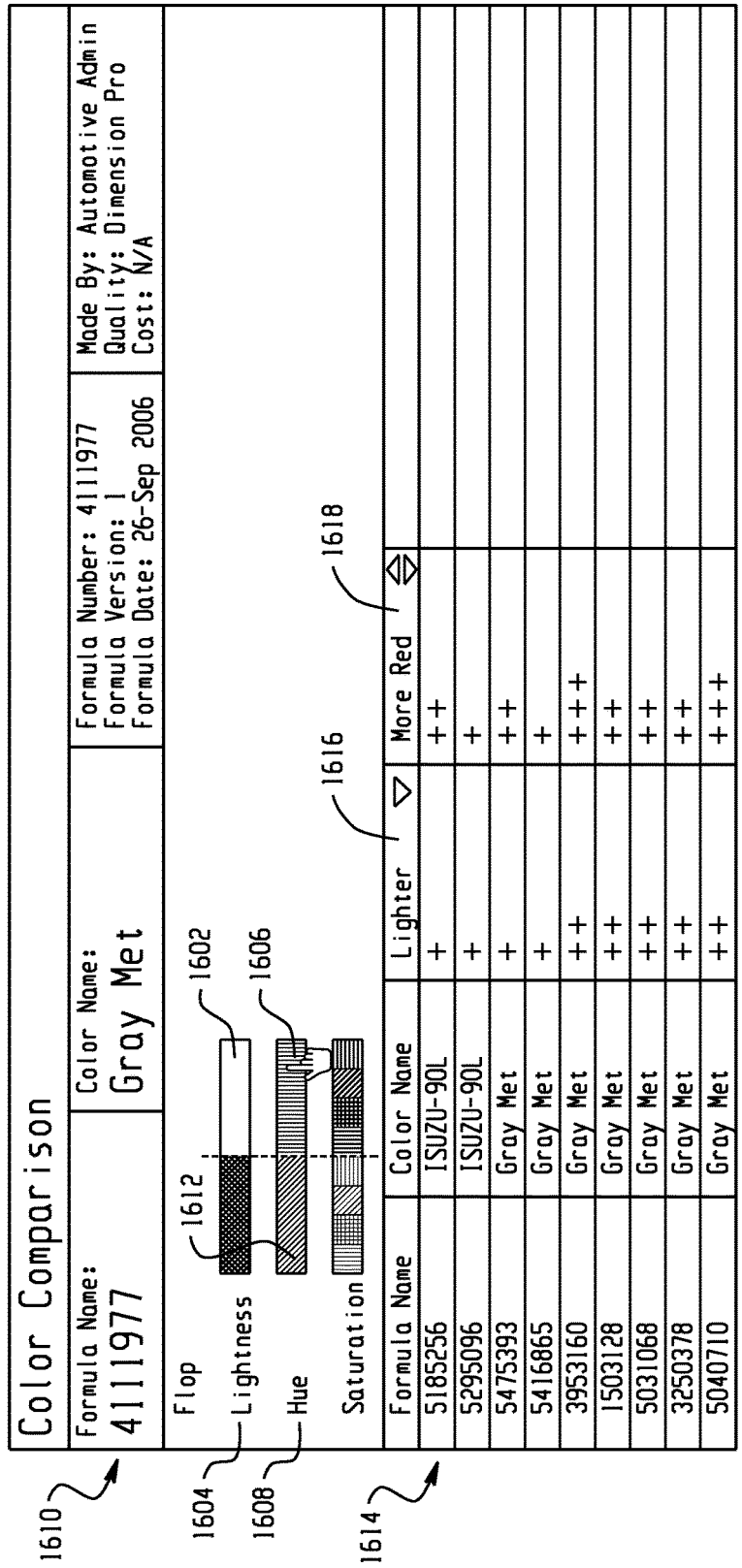
FIG. 16 depicts the example display following an additional selection of a "More Red" side of a second filter control associated with the hue color metric.

FIG. 16 depicts the example display following an additional selection of a "More Red" side of a second filter control associated with the hue color metric. A user has previously selected the right side 1602 of the lightness filter control 1604 and has now selected a right side 1606 of a hue filter control 1608. The right side 1606 of the hue filter control commands display of only colors that are redder than the reference color described at 1610, while the left side 1612 commands display of only colors that are greener. In one embodiment, the colors (e.g., red/green, yellow/red, blue/red, blue/yellow, blue/green) are dynamically selected based on attributes of the selected reference color. For example, for an orange reference color, the hue filter control, in one embodiment, enables selection of colors that are redder or more yellow than the selected reference color. Having selected colors that are lighter than the reference color at 1602 and redder than the reference color at 1606, the color filtration engine updates the bottom portion 1614 of the display to show only candidate colors that are both lighter than the selected reference color and more red than the selected reference color. A column is provided at 1616 indicating a lightness difference between the listed candidate color and the reference color while an additional column is provided at 1618 indicating a magnitude of redness difference between the listed candidate colors and the reference color.

Figure 17:
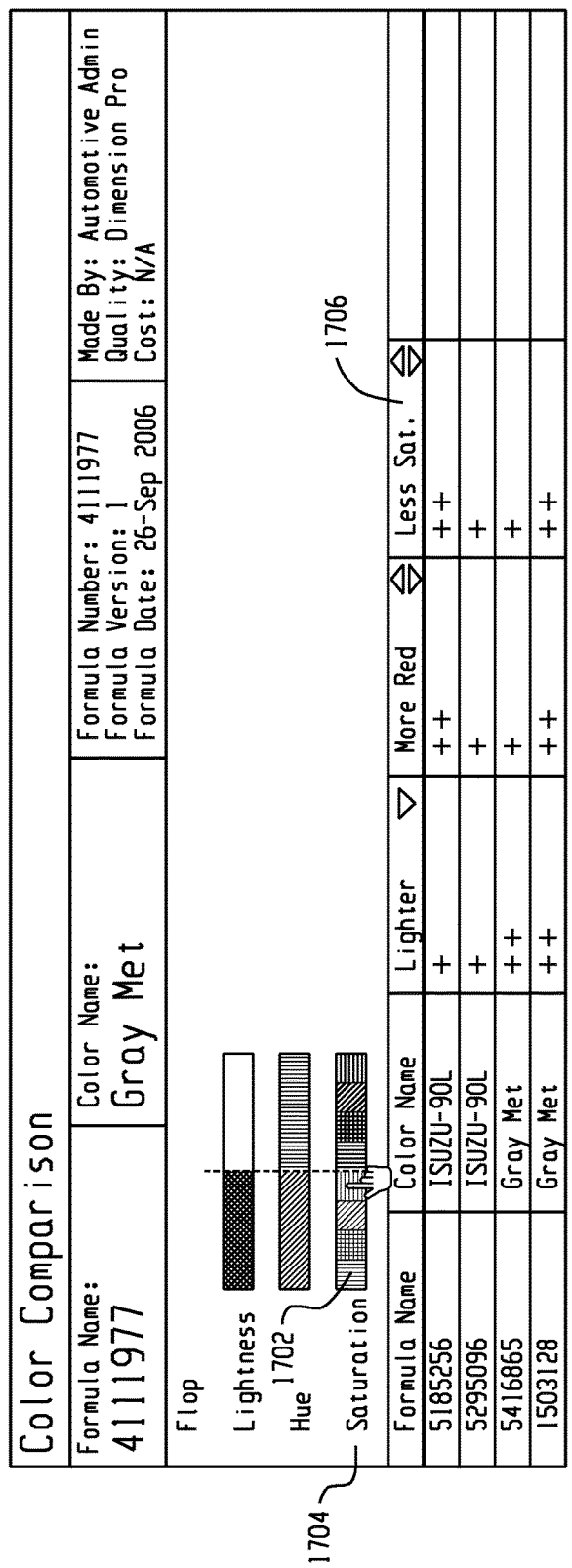
FIG. 17 depicts the example display following an additional selection of a "Less Saturated" side of a third filter associated with the saturation color metric.

FIG. 17 depicts the example display following an additional selection of a "Less Saturated" side of a third filter associated with the saturation color metric. By selecting the left side 1702 of the saturation filter control 1704, the user has commanded further filtering of the nine candidate colors depicted in FIG. 16 to only display colors having less saturation than the candidate color. The color filtration engine performs this further filtering and provides the four colors displayed in FIG. 17. The display of FIG. 17 includes an additional column at 1706 that indicates a magnitude of saturation difference between each of the listed colors and the reference color. While the examples of FIGS. 14-17 depict filter controls associated with lightness, hue, and saturation, in other examples the display includes one or more filter controls associated with other color metrics, which include finish, gloss, appearance, graininess, sparkle, and hiding.

FIG. 18 is a diagram depicting an example color filtering display having an alternate filter control format. While the examples of FIGS. 14-17 include filter controls having two sides positioned relative to a center line for selection, the example of FIG. 18 includes two separated buttons for each filter control, such as buttons 1802, 1804 for lightness filter control 1806. Similar to the aforementioned examples, by selecting the darker button at 1802, the color filtration engine limits the candidate color display to those that are darker than the candidate color described at the top portion 1808 of the display, while selection of the lighter button at 1804 results in display of only colors that are lighter than the reference color.

Figure 19:
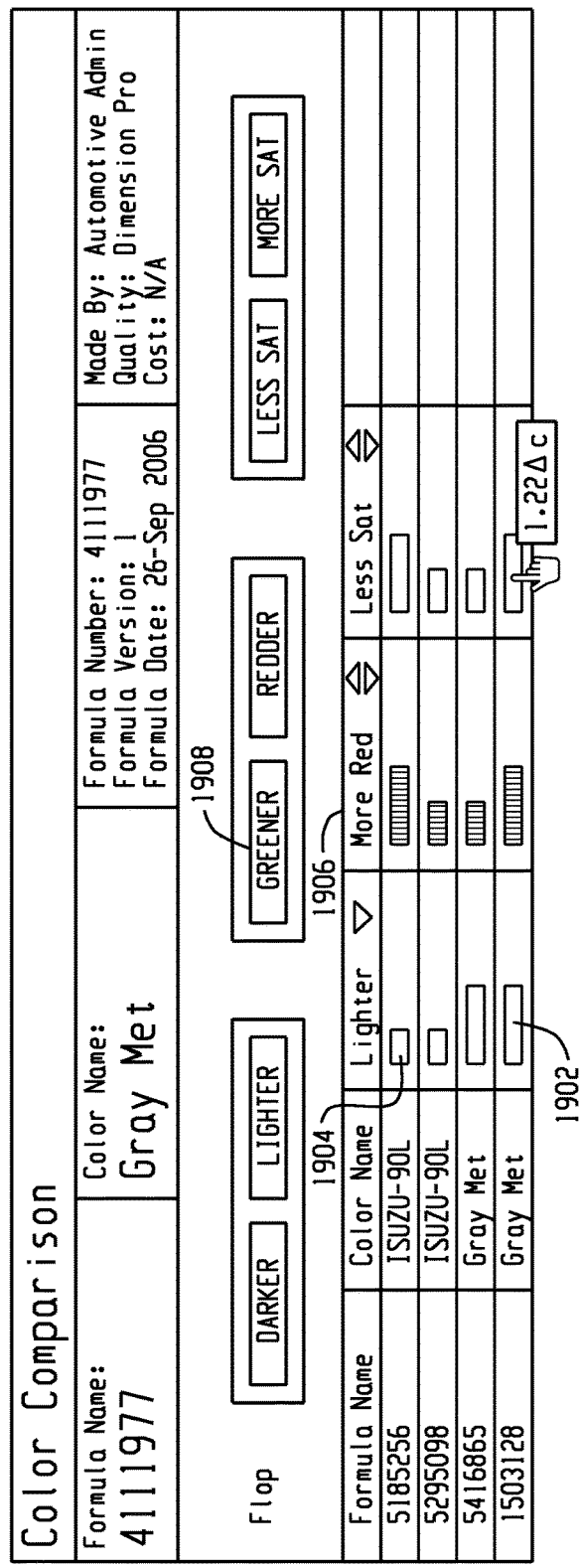
FIG. 19 is a diagram depicting an example color filtering display having an alternate color metric comparison format.

FIG. 19 is a diagram depicting an example color filtering display having an alternate color metric comparison format. While the examples of FIGS. 14-17 include columns having "+" symbols that indicate magnitude of differences between color metrics (i.e., lightness, hue, saturation) of the listed candidate colors and the reference color, the example of FIG. 19 includes bars of lengths corresponding to the magnitude of differences. Thus, a candidate color having a long bar (e.g., at 1902) in the lightness column is substantially lighter than the reference color, while a candidate color having a short bar (e.g., at 1904) in the lightness column is only slightly lighter than the reference color. In one embodiment, the hue indicator bars in the column at 1906 are colored according to the colors (i.e., red/green) of the hue filter control at 1908.

Figure 20:
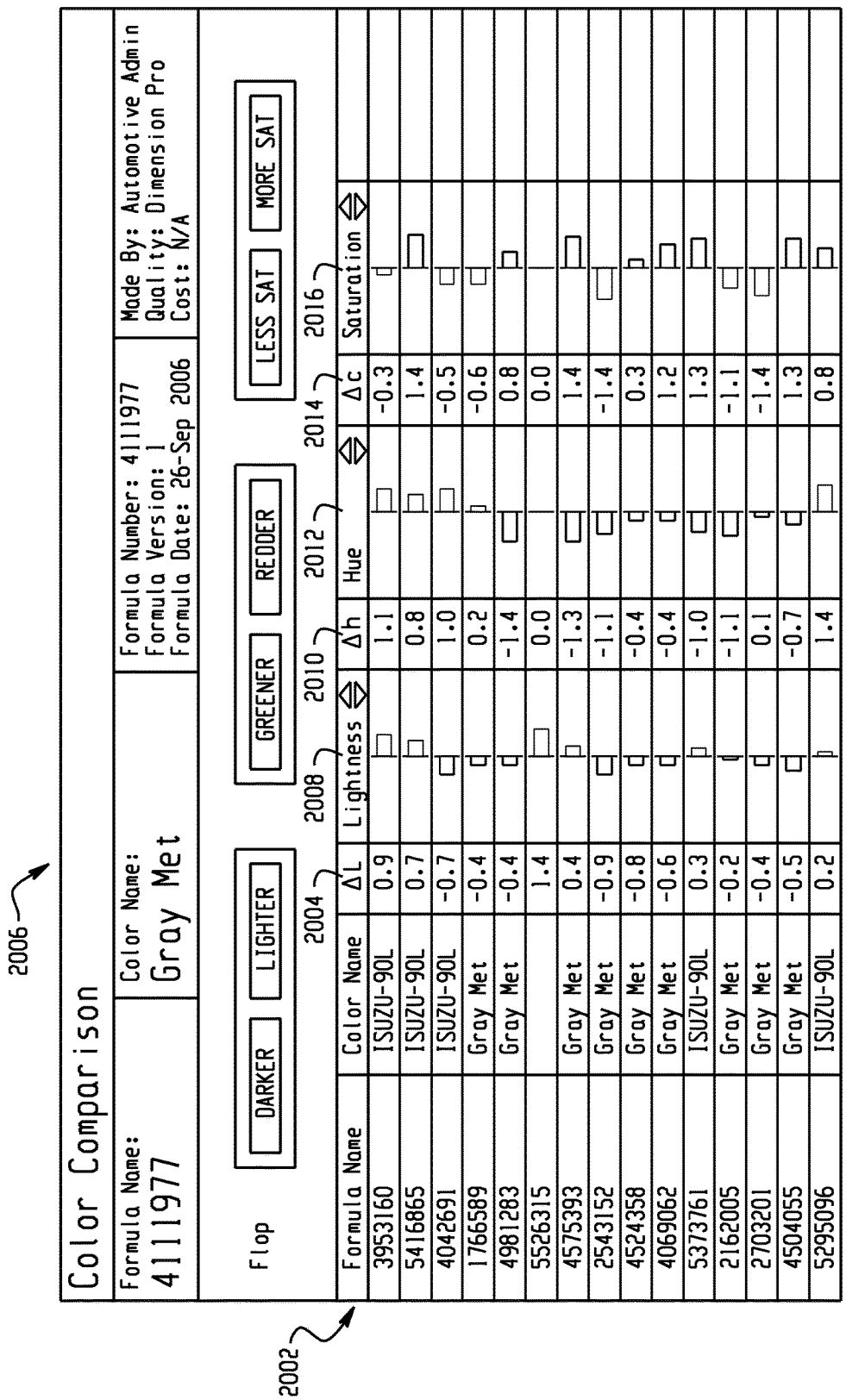
FIG. 20 is a diagram depicting an example color filtering display having color metric comparison indicators displayed before interaction with any filter controls.

FIG. 20 is a diagram depicting an example color filtering display having color metric comparison indicators displayed before interaction with any filter controls. Each listed color in the bottom portion 2002 of the display includes two indicators associated with each of the three color metrics of the filter controls. A column at 2004 provides a numerical indication of a lightness metric difference between listed colors and the reference color described in the top portion 2006. A column at 2006 provides a graphical indication of the lightness metric difference, with bars to the right indicating lighter colors and bars to the left indicating darker colors. A column at 2010 provides a numerical indication of a hue metric difference between listed colors and the reference color described in the top portion 2006. A column at 2012 provides a graphical indication of the hue metric difference, with bars to the right indicating redder colors and bars to the left indicating greener colors. A column at 2014 provides a numerical indication of a saturation metric difference between listed colors and the reference color described in the top portion 2006. A column at 2016 provides a graphical indication of the saturation metric difference, with bars to the right indicating more saturated colors and bars to the left indicating less saturated colors. FIG. 21 depicts the display of FIG. 20 following selection of filter control buttons to command display of colors that are lighter, redder, and less saturated than the reference color.

The filters described above enable a user to identify a desirable color from a possibly large pool of candidate colors based on differences from a selected reference color. The user can then select a displayed color from the filtered list for further interaction. In one embodiment of the disclosure, functionality is provided for further interaction where parameters of a selected color from the list are adjusted to generate a new color. Upon adjustment of that new color, the new color can be saved to a candidate color data store for future selection and use by the user and/or other users.

Figure 22:
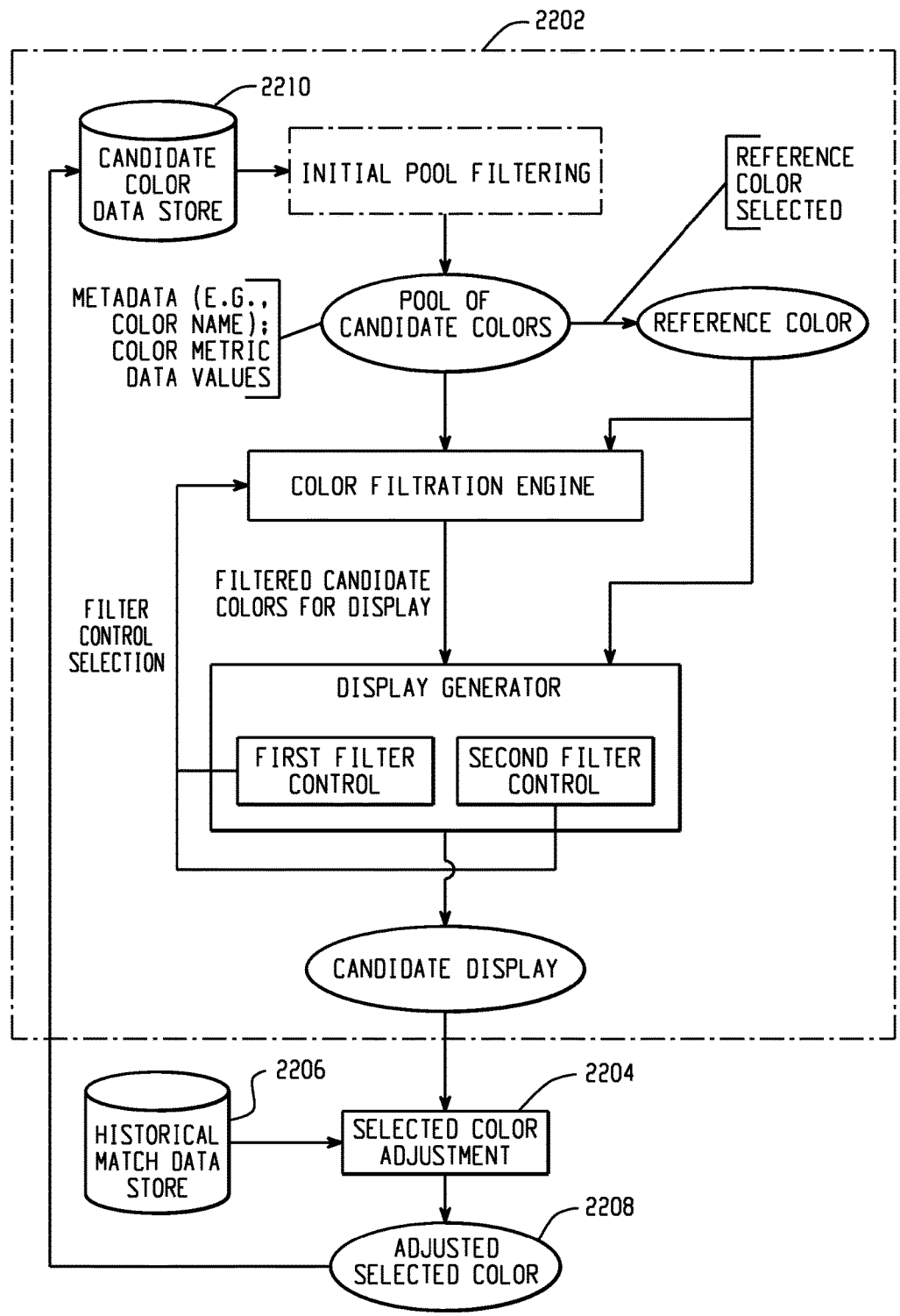
FIG. 22 is a diagram depicting a system for filtering of a pool of candidate colors relative to a reference color using filter controls, where a new color created based on a selected color from the filtered list is saved for future use.

FIG. 22 is a diagram depicting a system for filtering of a pool of candidate colors relative to a reference color using filter controls, where a new color created based on a selected color from the filtered list is saved for future use. Functionality is provided at 2202 that is similar to the systems and methods described in the preceding figures, where a set of candidate colors are accessed, a reference color is selected, and the candidate colors are filtered relative to the reference color and displayed based on user selection of filter controls. At 2204, a displayed color is selected from the filtered list and is provided for adjustment. A color adjustment graphical user interface is provided that enables a user to adjust parameters of the selected color to generate a new color. In one embodiment, certain parameters of the selected color are automatically adjusted based on data accessed from a historical match data store 2206. In one embodiment, the color adjustment at 2204 automatically accesses color preferences associated with the particular user from the historical match data store 2206. An initial color adjustment option for the user is displayed based on the historical data. For example, where the particular user using the filtering functionality at 2202 tends to like glossy colors, the color adjustment at 2204 provides an initial adjustment selection that is glossier than the color selected via the filtering functionality. The user is then free to further adjust the color as desired to generate an adjusted selected color 2208.

Figure 23:
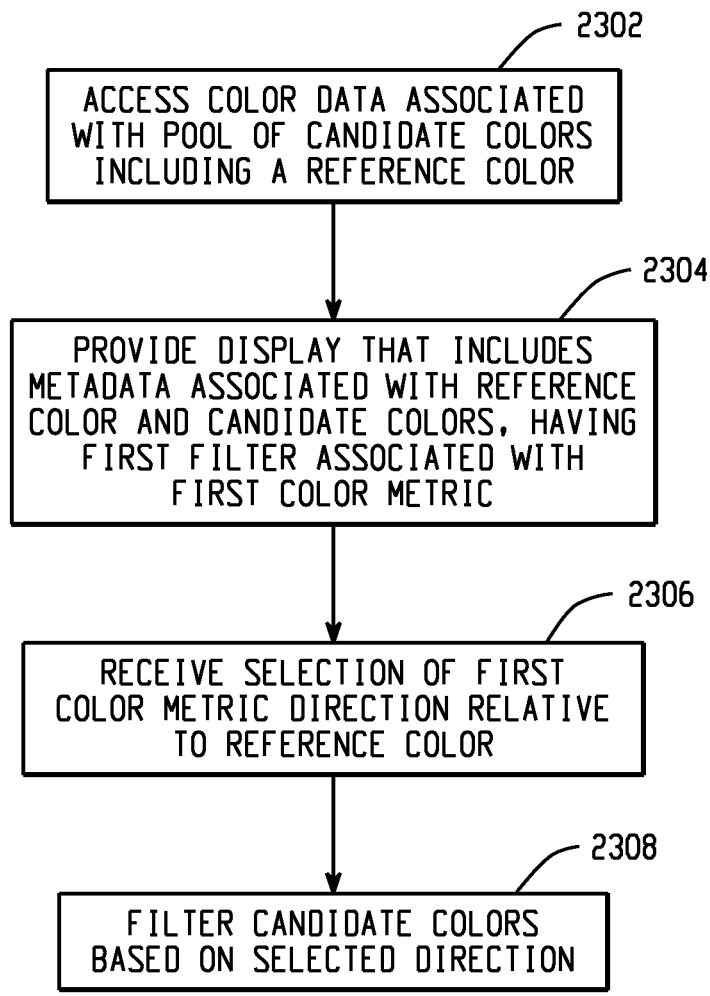
FIG. 23 is a flow diagram depicting a method of providing a color identification display that provides a filtered list of colors for selection.

The outputted color can then be utilized in a variety of manners. For example, the adjusted selected color can be added to the candidate color data store 2210 for future use, where metadata associated with the newly created color (e.g., a name, a formula number, a creation date, a creator identifier) are appended to the color data associated with the new color and stored in the candidate color data store 2210. Additionally, the newly created color can be transmitted to a color production site for production of a batch of the color or directly to a color additive dispenser and scale to physically start generation of a paint batch. FIG. 23 is a flow diagram depicting a method of providing a color identification display that provides a filtered list of colors for selection. At 2302, color data associated with a pool of candidate colors is accessed, where a first color metric and a second color metric are associated with each candidate color, and color data associated with a reference color is accessed, where the color data associated with the reference color includes values for the first color metric and the second color metric. At 2304, a display is provided that includes metadata associated with the reference color and metadata associated with a plurality of candidate colors from the pool of candidate colors, where the display includes a first filter control associated with the first color metric and a second filter control associated with the second metric, where the first filter control and the second filter control are each selectable in two directions relative to the first color metric value and the second color metric value of the reference color. At 2306, a selection of a first color metric direction relative to the reference color is received via the first filter control, and at 2308, the plurality of candidate colors provided on the display are filtered based on the selected first color metric direction.

The invention has been described with reference to particular exemplary embodiments. However, it will be readily apparent to those skilled in the art that it is possible to embody the invention in specific forms other than those of the exemplary embodiments described above. The embodiments are merely illustrative and should not be considered restrictive. The scope of the invention is reflected in the claims, rather than the preceding description, and all variations and equivalents which fall within the range of the claims are intended to be embraced therein.

For example, the systems and methods may utilize data signals conveyed via networks (e.g., local area network, wide area network, internet, combinations thereof, etc.), fiber optic medium, modulated carrier waves, wireless networks, etc. for communication with one or more data processing devices. The data signals can carry any or all of the data disclosed herein that is provided to or from a device. Additionally, the methods and systems described herein may be implemented on many different types of processing devices by computer program code comprising program instructions that are executable by a processing system. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The data (e.g., associations, mappings, data input, data output, intermediate data results, final data results, etc.) received and processed may be stored and implemented in one or more different types of computer-implemented data stores, such as different types of computer-readable storage devices (e.g., RAM, ROM, Flash memory, magnetic disks, optical disks, etc.) and programming constructs (e.g., flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. Software operation can be implemented, for example, as a subroutine unit of code, a software function unit of code, an object (as in an object-oriented paradigm), an applet, or in a computer script language, or as another type of computer code. The software components and/or functionality may be located on a single computer or distributed across multiple computers in communication with one another depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. An internet-based color management method for paint systems, comprising:
    receiving, at a server, color measurement data for a coating of paint, the color measurement data transmitted via a network from a particular client;
    identifying a color formulation based on the color measurement data;
    accessing historical color recommendation data from a data repository, wherein the data repository contains color data that is based on previous color recommendations for the particular client;
    adjusting the color formulation based on historical color recommendation data associated with the particular client to more closely match an actual color of the coating of paint;
    transmitting the adjusted color formulation from the server via the network for acceptance by the particular client;
    upon acceptance, storing the adjusted color formulation in the data repository, wherein the adjusted color formulation is stored in a data record that is associated with the particular client; and
    transmitting the adjusted color formulation to an automated dispenser that selects, dispenses and weighs color additive based on the adjusted color formulation for use in adding the color additive to a base color to generate a matched paint.

2. The method of claim 1, wherein a list of color formulations is identified based on the color measurement data;
    wherein the historical color recommendation data identifies a frequency of recommendation associated with each color formulation on the list; and
    wherein adjusting the color formulation comprises selecting one of the color formulations based on the frequencies of recommendation.

3. The method of claim 1,
    wherein the historical color recommendation data includes a preference of the particular client;
    wherein, the color formulation is adjusted based on the preference.

4. The method of claim 1, further comprising:
    receiving, at the server, color identification data transmitted via the network, wherein the color formulation is identified based on the color measurement data and the color identification data.

5. The method of claim 4, wherein identifying the color formulation comprises:
    determining a close base color based on the color measurement data; and
    correcting the close base color based on the color measurement data.

6. The method of claim 1, wherein the adjusted color formulation is transmitted to a peripheral scale, wherein colorant is automatically weighed by the scale based on the adjusted color formulation.

7. The method of claim 6, further comprising:
receiving client adjustment data at the server from a color additive dispenser based on a scale-determined amount of color additive that is being added to a batch of colorant currently being generated, wherein the client adjustment data is stored in the data repository, and wherein a future adjusted color formulation is generated based on the client adjustment data.

8. The method of claim 1, further comprising:
performing a data mining operation on data records in the data repository associated with the particular client, wherein the data mining operation identifies a preference of the particular client based on the data records.

9. The method of claim 8, wherein the preference is identified by determining differences between adjusted color formulations that the particular client accepted and adjusted color formulations that the particular client rejected.

10. The method of claim 1, wherein the color measurement data is captured using a spectrophotometer.

11. The method of claim 1, further comprising:
receiving second color measurement data at the server via the network, wherein the second color measurement data is based on paint created using the adjusted color formulation;
further adjusting the adjusted color formulation to generate a second adjusted color formulation based on the color measurement data and the second color measurement data, wherein the second adjusted color formulation is transmitted from the server via the network.

12. The method of claim 1, wherein the color measurement data is transmitted to the server via a web interface.

13. The method of claim 1, wherein the data repository contains color data associated with a plurality of different customers.

14. The method of claim 1, wherein the particular client is a single person or a group of people.

15. A computer-implemented system for determining an amount of color additive to add to paint, comprising:
a server receiver configured to receive color measurement data for a coating of paint, the color measurement data transmitted via a network from a particular client;
a data repository configured to contain historical recommendation data based on previous color recommendations;
one or more data processors configured to:
identify a color formulation based on the color measurement data;
access historical color recommendation data associated with the particular client from the data repository; and
adjust the color formulation based on the historical color recommendation data associated with the particular client to more closely match an actual color of the coating of paint;
transmit the adjusted color formulation from the server via the network for acceptance by the particular client;
upon acceptance, store the adjusted color formulation in the data repository, wherein the adjusted color formulation is stored in a data record that is associated with the particular client; and
transmit the adjusted color formulation to an automated dispenser that selects, dispenses and weighs color additive based on the adjusted color formulation for use in adding the color additive to a base color to generate a matched paint.

16. The system of claim 15, wherein the color measurement data is captured via a spectrophotometer and is transmitted to the server receiver via a web interface.

17. The system of claim 15, wherein the data repository is configured to contain previous color recommendations associated with a plurality of different customers.

18. The system of claim 15, further comprising a color additive dispenser and a scale, wherein the color additive dispenser is configured to receive the adjusted color formulation, and wherein colorant is weighed and dispersed based on the adjusted color formulation.

\* \* \* \* \*